(12) United States Patent
Moffat et al.

(10) Patent No.: US 11,928,255 B2
(45) Date of Patent: Mar. 12, 2024

(54) CONTROL OF A COMPUTER VIA DISTORTIONS OF FACIAL GEOMETRY

(71) Applicants: Brian Lee Moffat, Portland, OR (US); Rin In Chen, Portland, OR (US)

(72) Inventors: Brian Lee Moffat, Portland, OR (US); Rin In Chen, Portland, OR (US)

( * ) Notice: Subject to any disclaimer, the term of this patent is extended or adjusted under 35 U.S.C. 154(b) by 9 days.

(21) Appl. No.: 17/669,170

(22) Filed: Feb. 10, 2022

(65) Prior Publication Data

US 2022/0229489 A1 Jul. 21, 2022

Related U.S. Application Data

(63) Continuation of application No. 16/990,917, filed on Aug. 11, 2020, now Pat. No. 11,275,435, which is a
(Continued)

(51) Int. Cl.
*G06F 3/01* (2006.01)
*G06F 3/023* (2006.01)
(Continued)

(52) U.S. Cl.
CPC .............. *G06F 3/012* (2013.01); *G06F 3/011* (2013.01); *G06F 3/013* (2013.01); *G06F 3/017* (2013.01); *G06F 3/0233* (2013.01); *G06F 3/0304* (2013.01); *G06V 40/11* (2022.01); *G06V 40/113* (2022.01); *G06V 40/175* (2022.01);
(Continued)

(58) Field of Classification Search
CPC .. G06V 40/174; G06V 40/175; G06V 40/176; G06F 3/011; G06F 3/012; G06F 3/013; G06F 3/017; G06F 3/0233; G06F 3/0304
See application file for complete search history.

(56) References Cited

U.S. PATENT DOCUMENTS 8,269,834 B2 * 9/2012 Albertson et al. .......................... G08B 13/19613 706/14
10,234,938 B2 * 3/2019 Moffat et al. ......... G06F 3/0304
(Continued)

*Primary Examiner* — Andrew W Johns
(74) *Attorney, Agent, or Firm* — Fulwider Patton LLP

(57) ABSTRACT

A system which, with data provided by one or more sensors, detects a user's alteration of the geometries of parts of his face, head, neck, and/or shoulders. It determines the extent of each alteration and normalizes it with respect to the maximum possible range of each alteration so as to assign to each part-specific alteration a numeric score indicative of its extent. The normalized part-specific scores are combined so as to produce a composite numeric code representative of the complete set of simultaneously-executed geometric alterations. Each composite code is translated, or interpreted, relative to an appropriate context defined by an embodiment, an application executing on an embodiment, or
(Continued)

by the user. For example, each composite code might be interpreted as, or assigned to, a specific alphanumeric letter, a color, a musical note, etc. Through the use of this system, a user may communicate data and/or commands to a computerized device, while retaining full use of his hands and his voice for other tasks, and while being free to focus his visual attention on something other than the system.

18 Claims, 22 Drawing Sheets

Related U.S. Application Data continuation of application No. 16/260,568, filed on Jan. 29, 2019, now Pat. No. 10,754,424, which is a continuation of application No. 15/546,929, filed as application No. PCT/US2016/016024 on Feb. 1, 2016, now Pat. No. 10,234,938.

(60) Provisional application No. 62/125,758, filed on Jan. 31, 2015.

(51) Int. Cl.
*G06F 3/03* (2006.01)
*G06V 40/10* (2022.01)
*G06V 40/16* (2022.01)
*G06V 40/18* (2022.01)
*G06V 40/20* (2022.01)

(52) U.S. Cl.
CPC .......... *G06V 40/176* (2022.01); *G06V 40/193* (2022.01); *G06V 40/28* (2022.01)

(56) References Cited

U.S. PATENT DOCUMENTS

| | | | |
|---|---|---|---|
| 10,754,424 B2* | 8/2020 | Moffat et al. | G06V 40/11 |
| 11,275,435 B2* | 3/2022 | Moffat et al. | G06V 40/176 |
| 2002/0109731 A1* | 8/2002 | Longobardi | G06F 3/023 |
| | | | 715/810 |
| 2003/0133599 A1* | 7/2003 | Tian et al. | G06V 40/175 |
| | | | 382/118 |
| 2004/0042661 A1* | 3/2004 | Ulrich et al. | G06V 10/772 |
| | | | 382/181 |
| 2012/0101735 A1* | 4/2012 | Velusamy et al. | G06V 40/176 |
| | | | 702/19 |
| 2012/0200492 A1* | 8/2012 | Zhao | G06V 40/107 |
| | | | 345/156 |
| 2012/0249825 A1* | 10/2012 | Maruyama et al. | H04N 23/611 |
| | | | 348/222.1 |
| 2014/0112556 A1* | 4/2014 | Kalinli-Akbacak | |
| | | | G06V 40/176 |
| | | | 382/128 |
| 2014/0139424 A1* | 5/2014 | Chang | G06F 3/011 |
| | | | 345/156 |
| 2016/0109961 A1* | 4/2016 | Parshionikar | G06F 3/013 |
| | | | 345/156 |
| 2016/0217321 A1* | 7/2016 | Gottlieb | G06V 40/175 |
| 2017/0140214 A1* | 5/2017 | Matas et al. | G06V 40/174 |

* cited by examiner

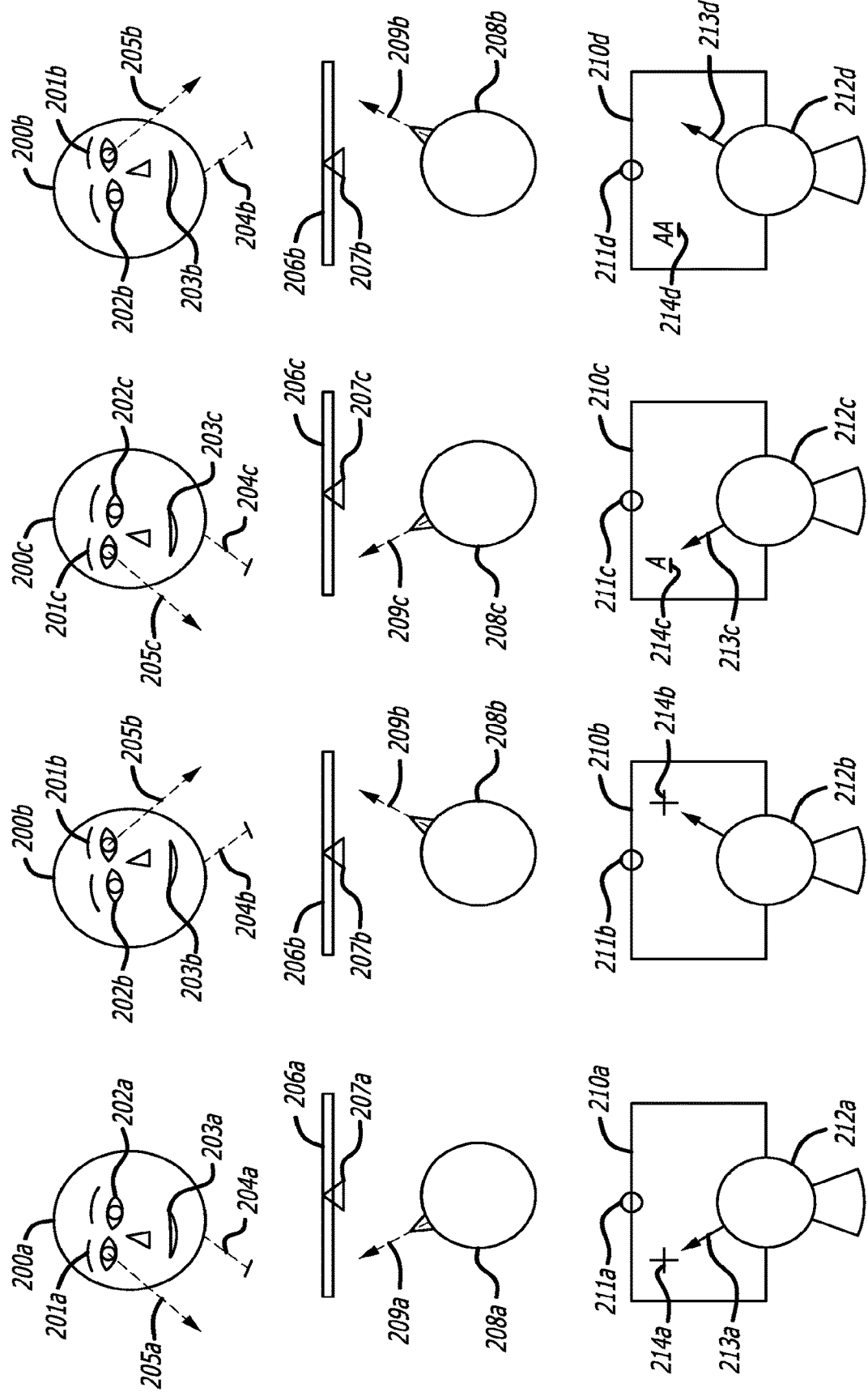

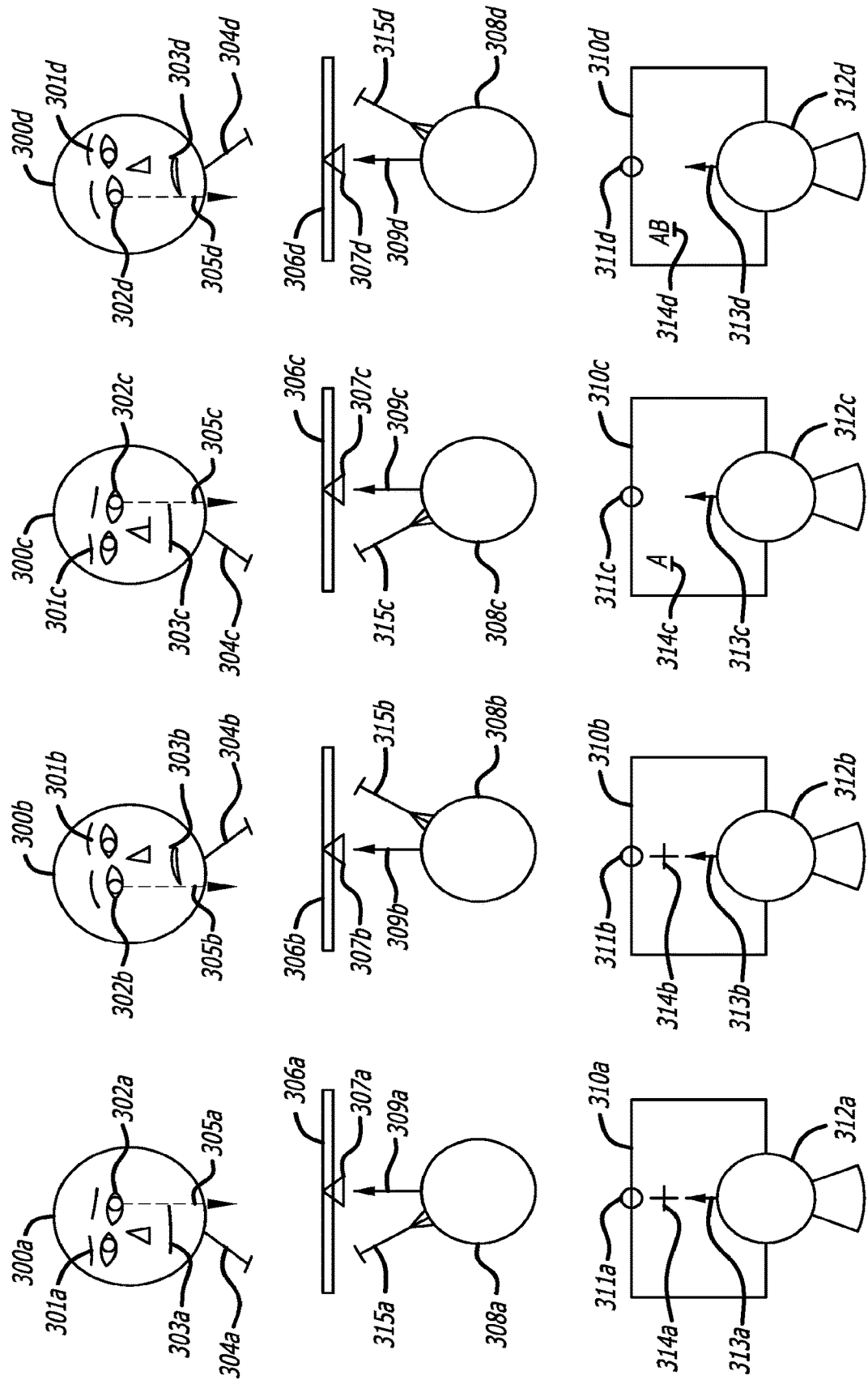

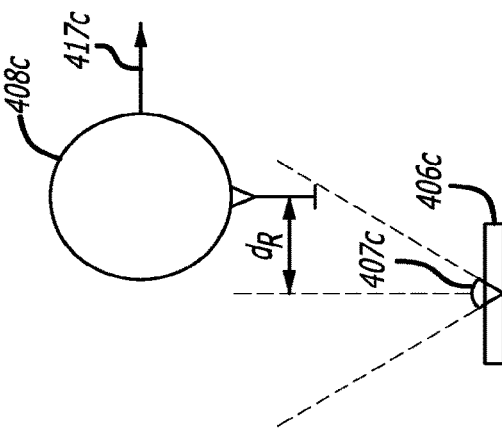
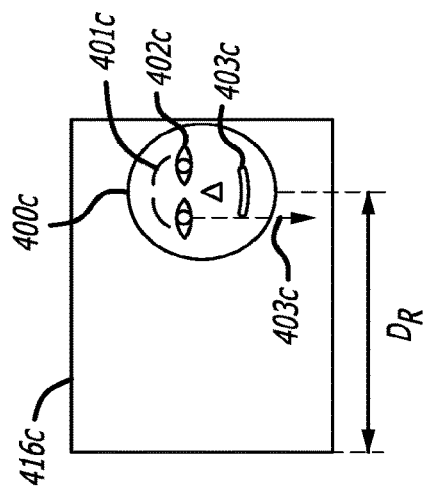
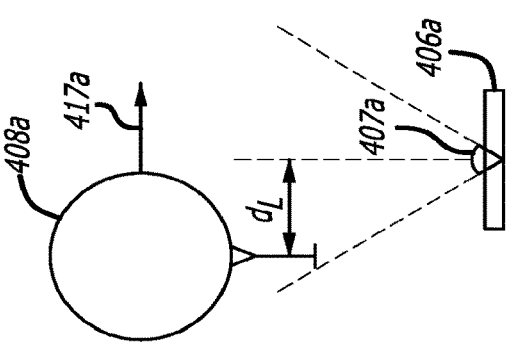
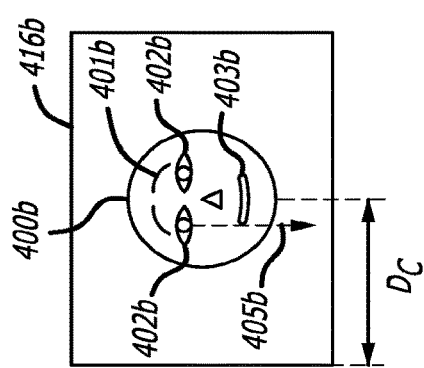
*FIG. 13_3*
*FIG. 13_2*
*FIG. 13_1*

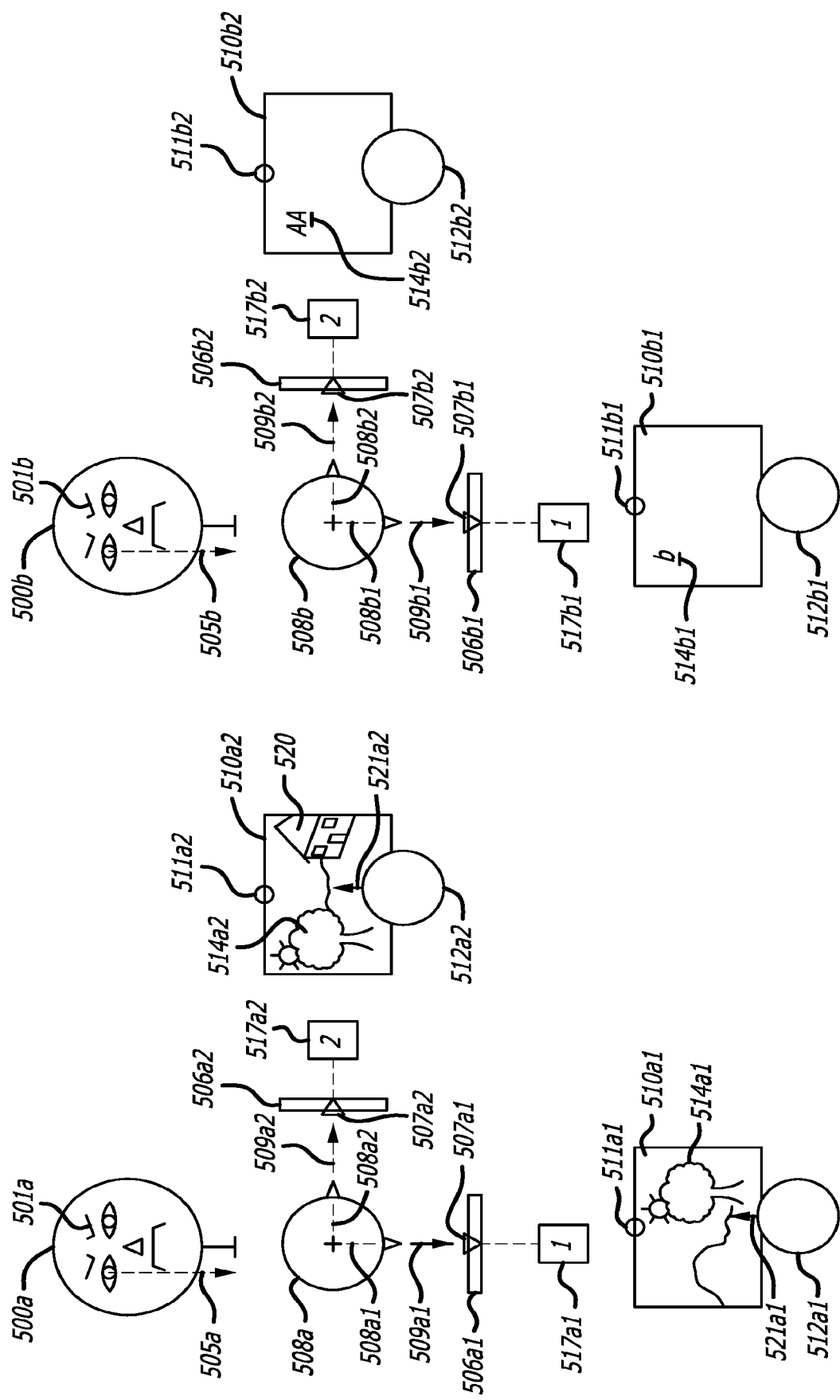

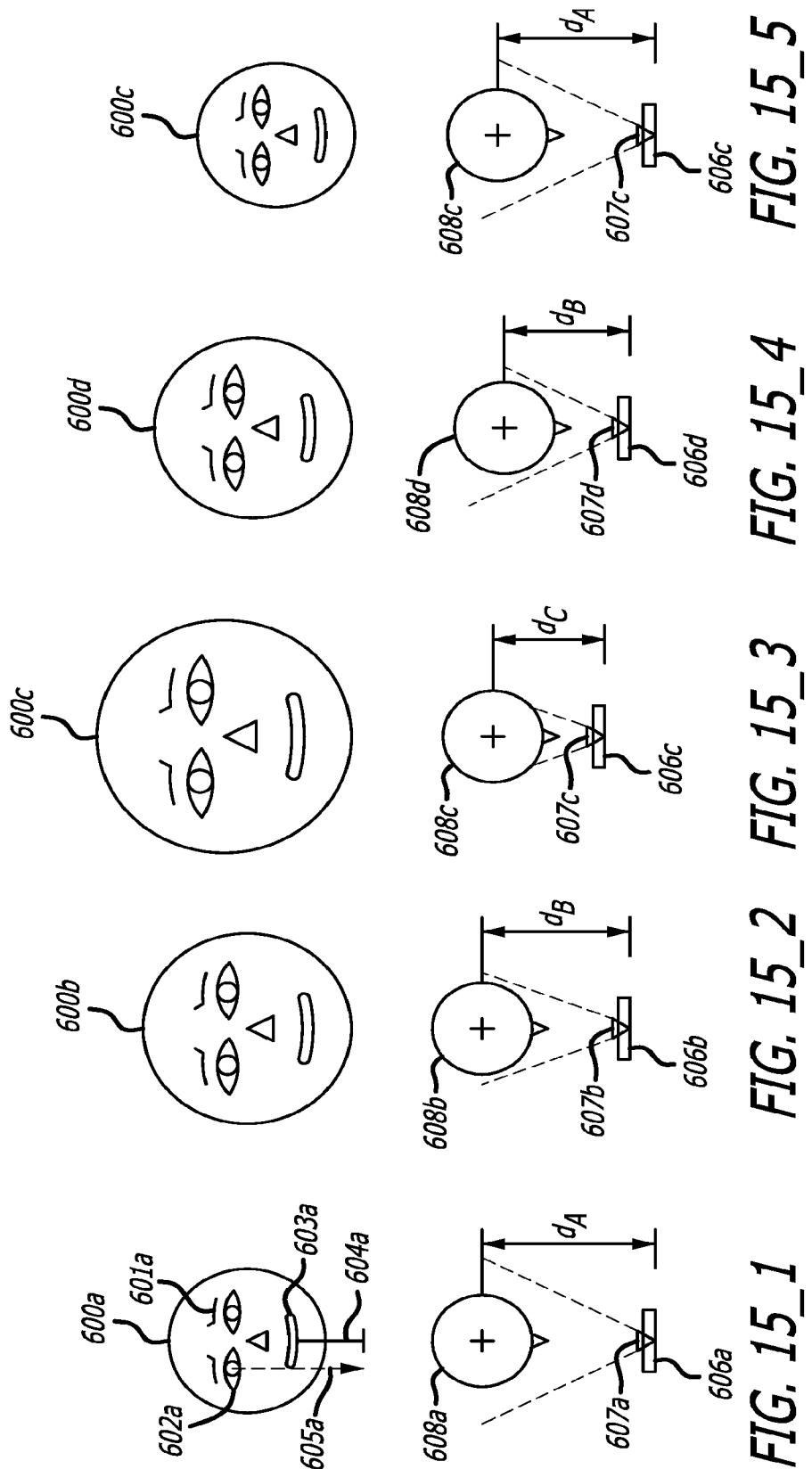

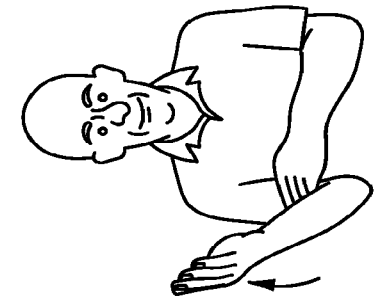
FIG. 19_4 MORNING
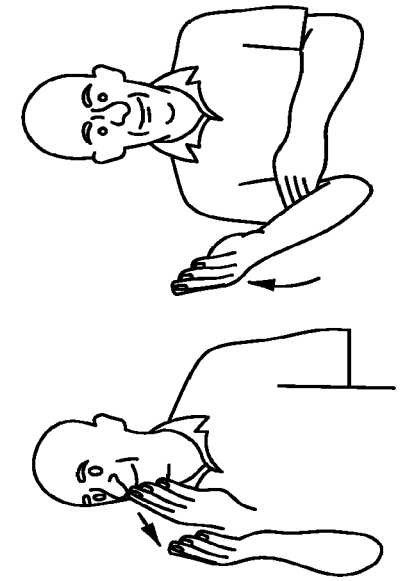
FIG. 19_3 GOOD
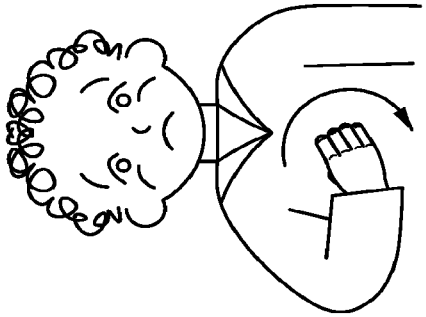
FIG. 19_2 SORRY
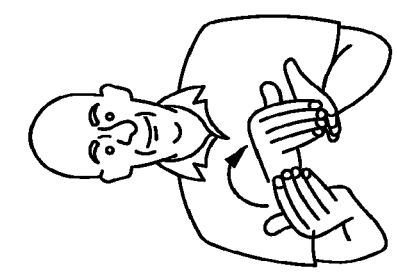
FIG. 19_1 AGAIN
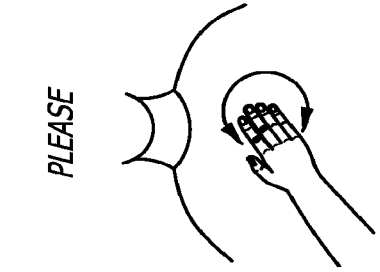
FIG. 19_8 PLEASE
FIG. 19_7 NO
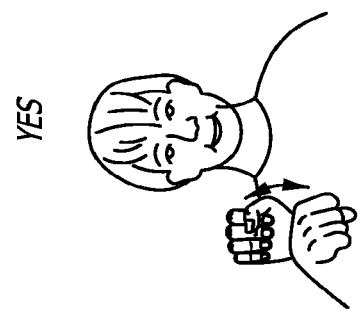
FIG. 19_6 YES
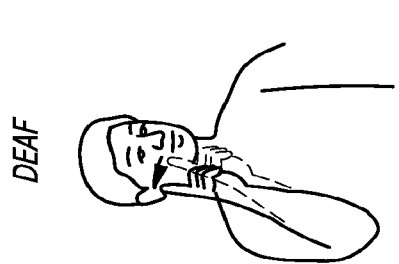
FIG. 19_5 DEAF

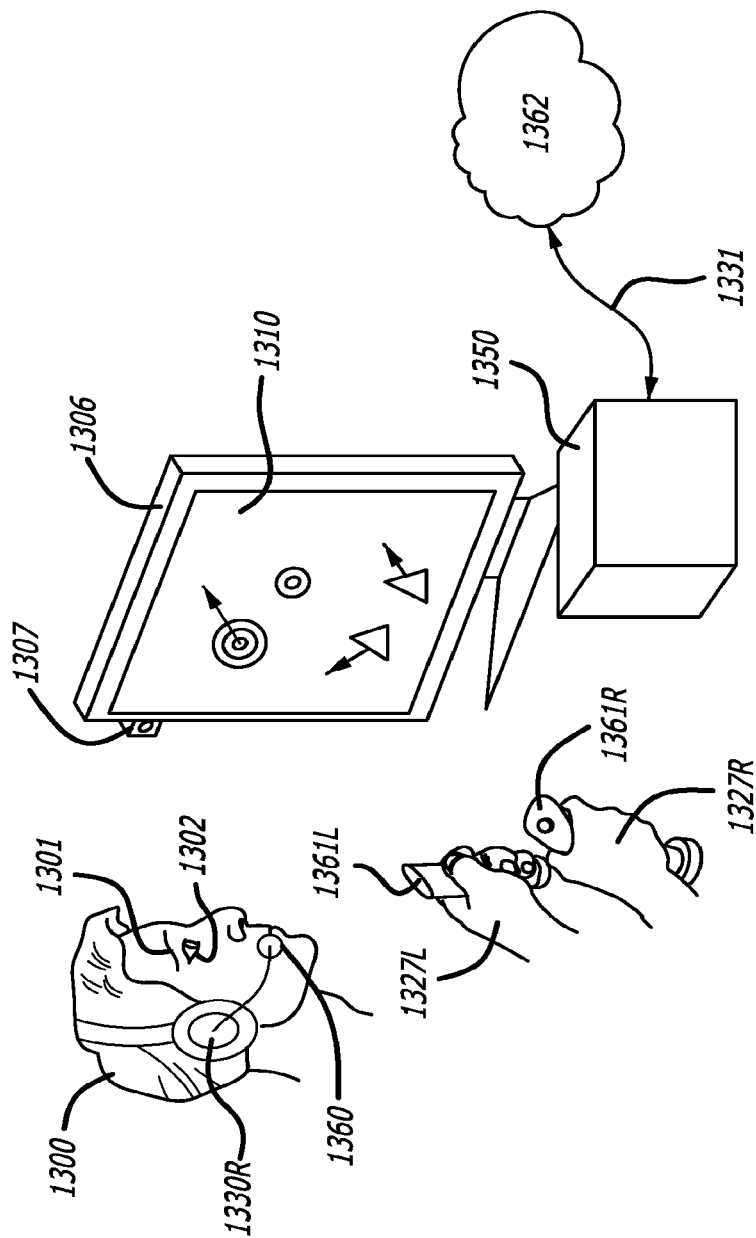

CONTROL OF A COMPUTER VIA DISTORTIONS OF FACIAL GEOMETRY

I. CROSS-REFERENCES TO RELATED APPLICATIONS

This is a continuation based on USSN 16,990,917, filed Aug. 11, 2020; which is a continuation based on U.S. Ser. No. 16/260,568, filed Jan. 29, 2019, U.S. Pat. No. 10,754,424, issued on Aug. 25, 2020; which is a continuation based on U.S. Ser. No. 15/546,929, filed on Jul. 27, 2017, U.S. Pat. No. 10,234,938, issued on Mar. 19, 2019; which is based upon and claims the benefit of priority from the prior Patent Application No. PCT/US16/16024, filed Feb. 1, 2016, which claims priority to U.S. Ser. No. 62/125,758, filed Jan. 31, 2015, incorporated by reference in its entirety.

II. BACKGROUND

Computerized devices are common today. They facilitate the editing of documents, the exchange of verbal information (e.g. "phone calls"), the creation and display of digital graphics and photos, financial transactions (e.g. "automated teller machines (ATMs)" and "point of sale (POS) terminals"), the playing of interactive and multi-player games, and so on. Users typically interact with, control, and submit data to, these computerized devices through their control of physical devices. Examples include a user: pressing the keys on a physical keyboard, touching a screen as it displays a virtual keyboard, moving by hand a computer mouse, etc. Users also interact with computerized devices through their speaking of verbal commands and data.

III. SUMMARY

Disclosed herein is a system which includes: at least one sensor configured to measure the state of a part of a user's face, head, neck, and/or shoulders; and a conversion circuit configured to convert at least one of the part-specific measure of state, generated by the at least one sensor, into at least one symbolic value; and to input at least one of the at least one symbolic value into at least one processor that alters at least one component and/or behavior of at least one computing device.

Also disclosed herein is a system which includes: (a) at least one sensor configured to capture at least one block of data related to at least one factor that changes contemporaneously with at least one change in the geometry of at least one user's face, head, neck, and/or shoulders; the at least one geometric change being manifested by the at least one user through the at least one user's innervation of at least one nerve; the innervation of the at least one nerve resulting in the contraction of at least one muscle; the contraction of the at least one muscle contributing, at least partially, to the manifestation of the at least one change in the geometry of at least one user's face, head, neck, and/or shoulders; (b) means for determining from at least one portion of at least one of the at least one block of data at least one factor-specific measurement; (c) means for quantizing each of the at least one factor-specific measurement of at least one of the at least one user to generate at least one "quantized factor measure"; (d) means for converting the at least one quantized factor measure into at least one user-specific "change signature"; (e) means for mapping the at least one change signature to at least one "symbolic value"; and (f) means for processing the at least one symbolic value. This system can further include: a first processor which includes the determining means, the quantizing means, the converting means and the mapping means; and a second processor which includes the processing means.

Additionally disclosed herein is a method which includes: measuring using at least one sensor the extent to which specific muscles, located, at least partially, within the face, head, neck, and/or shoulders, of a user are contracted and thereby derive a plurality of muscle-specific measurements; quantizing each of the muscle-specific measurements; combining the quantized muscle-specific measurements into a composite number unique to each unique combination of quantized muscle contractions; converting the composite number into a context-specific symbolic value; and using the context-specific value to modify at least one bit in a file or buffer of digital information and/or to modify the behavior of at least one computing device.

Further disclosed herein is a system which, with data provided by one or more sensors, detects a user's alteration of the geometries of parts of his face, head, neck, and/or shoulders. It determines the extent of each alteration and normalizes it with respect to the maximum possible range of each alteration so as to assign to each part-specific alteration a numeric score indicative of its extent. The normalized part-specific scores are combined so as to produce a composite numeric code representative of the complete set of simultaneously-executed geometric alterations. Each composite code is translated, or interpreted, relative to an appropriate context defined by an embodiment, an application executing on an embodiment, or by the user. For example, each composite code might be interpreted as, or assigned to, a specific alphanumeric letter, a color, a musical note, etc. Through the use of this system, a user may communicate data and/or commands to a computerized device, while retaining full use of his hands and his voice for other tasks, and while being free to focus his visual attention on something other than the system.

IV. BRIEF DESCRIPTION OF DRAWINGS

For a fuller understanding of the nature and objects of the invention, reference should be made to the following detailed description, taken in connection with the accompanying drawings, in which.

Figure 3:
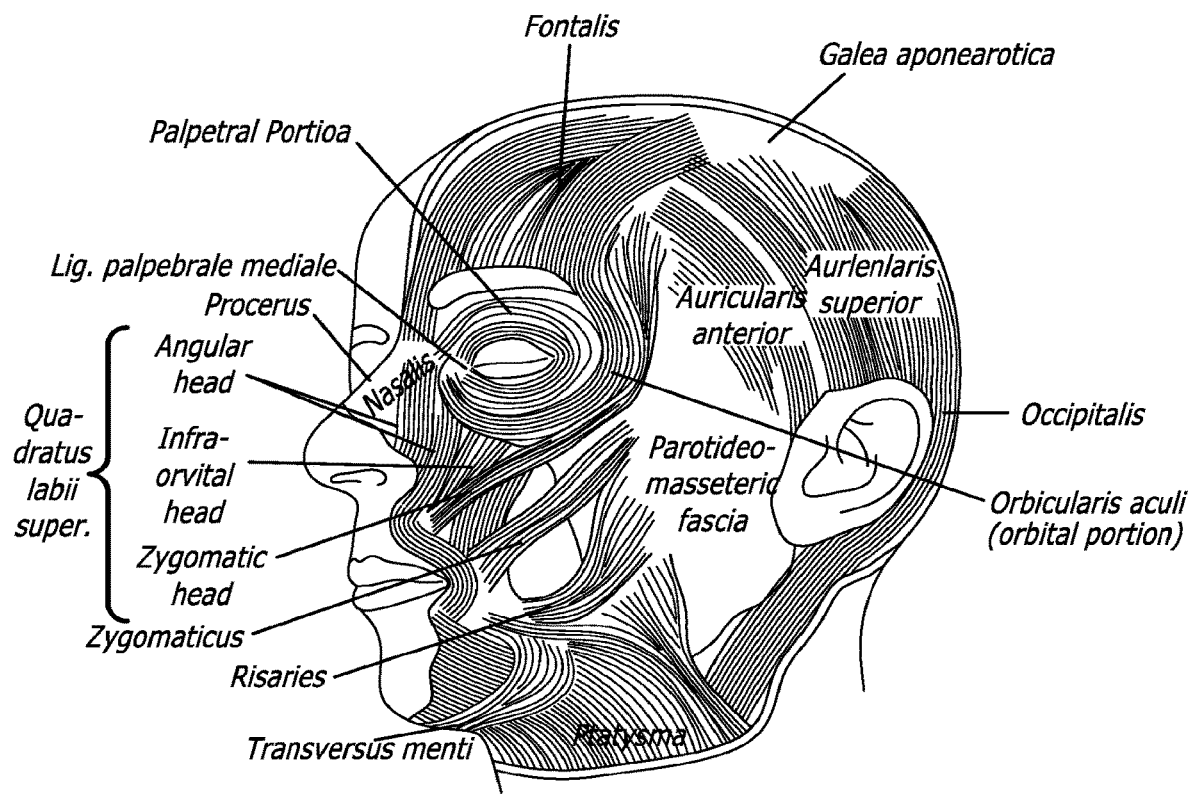

FIG. 3 is an illustration of some of the muscles that give rise to facial expressions, movements, and changes to the geometry of a person's face. This illustration is found in "Sobotta's Atlas and Text-book of Human Anatomy" published in 1909. The illustration was created by K. Hajek and A. Schmitson.

Figure 4:
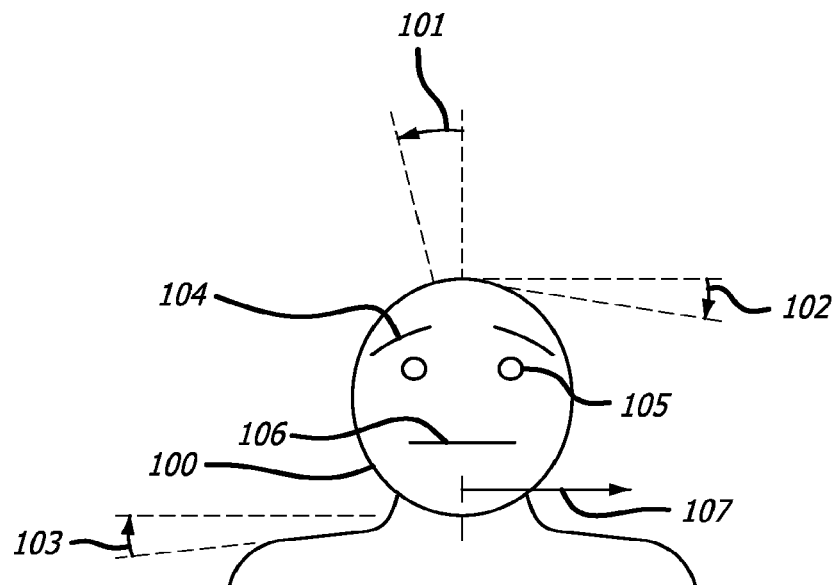

FIG. 4 is an illustration of seven user-controlled bodily signals used by an exemplary embodiment of the present disclosure. While this illustration is only intended to characterize these signals, one might nevertheless imagine that the illustration is representative of the type of image that might be captured by a camera incorporated within, or connected to, the embodiment.

Figure 5:
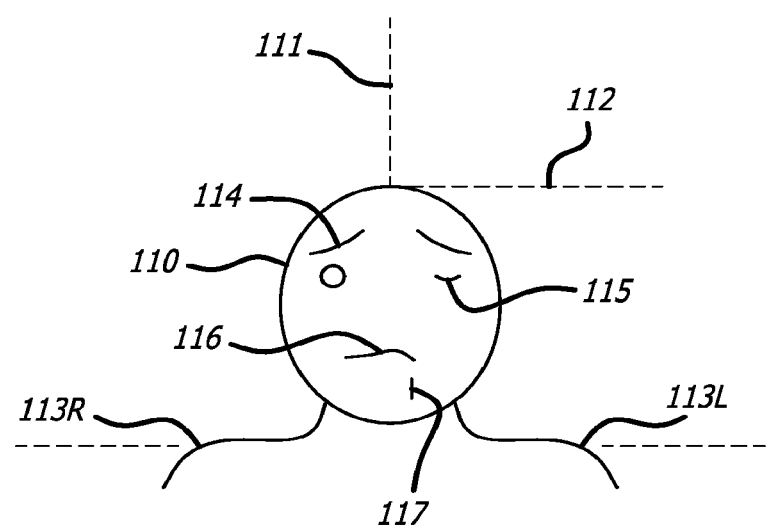

FIG. 5 is an illustration of the same user illustrated in FIG. 4 when that user is communicating a signal to the exemplary embodiment, and generating a signal value.

Figure 6:
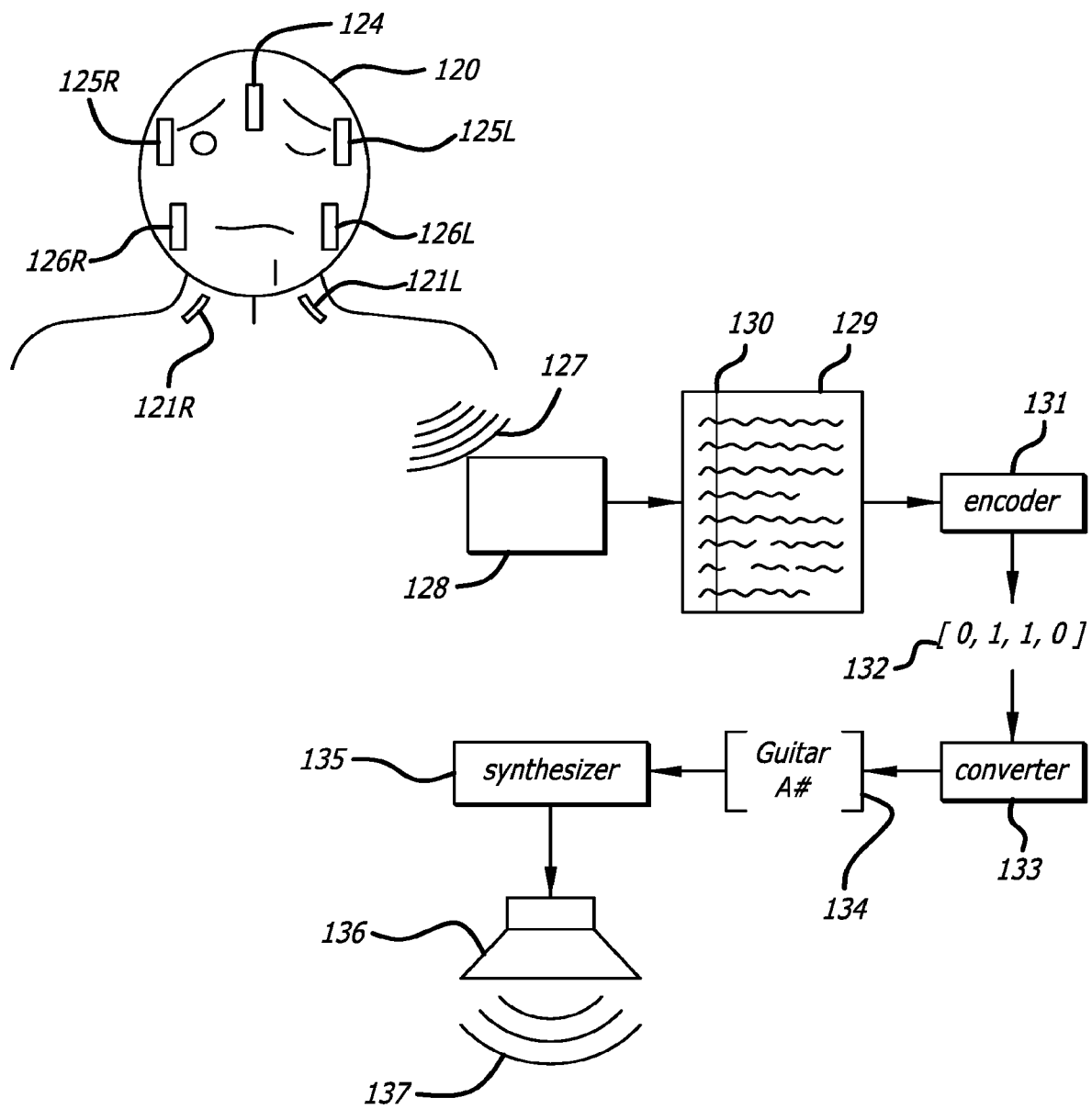

FIG. 6 is an illustration of an exemplary embodiment of the present disclosure. A user is generating music using only movements of four signals. The muscular contractions with which the user specifies the four signals are detected and measured with sensors attached to his skin.

Figure 7:
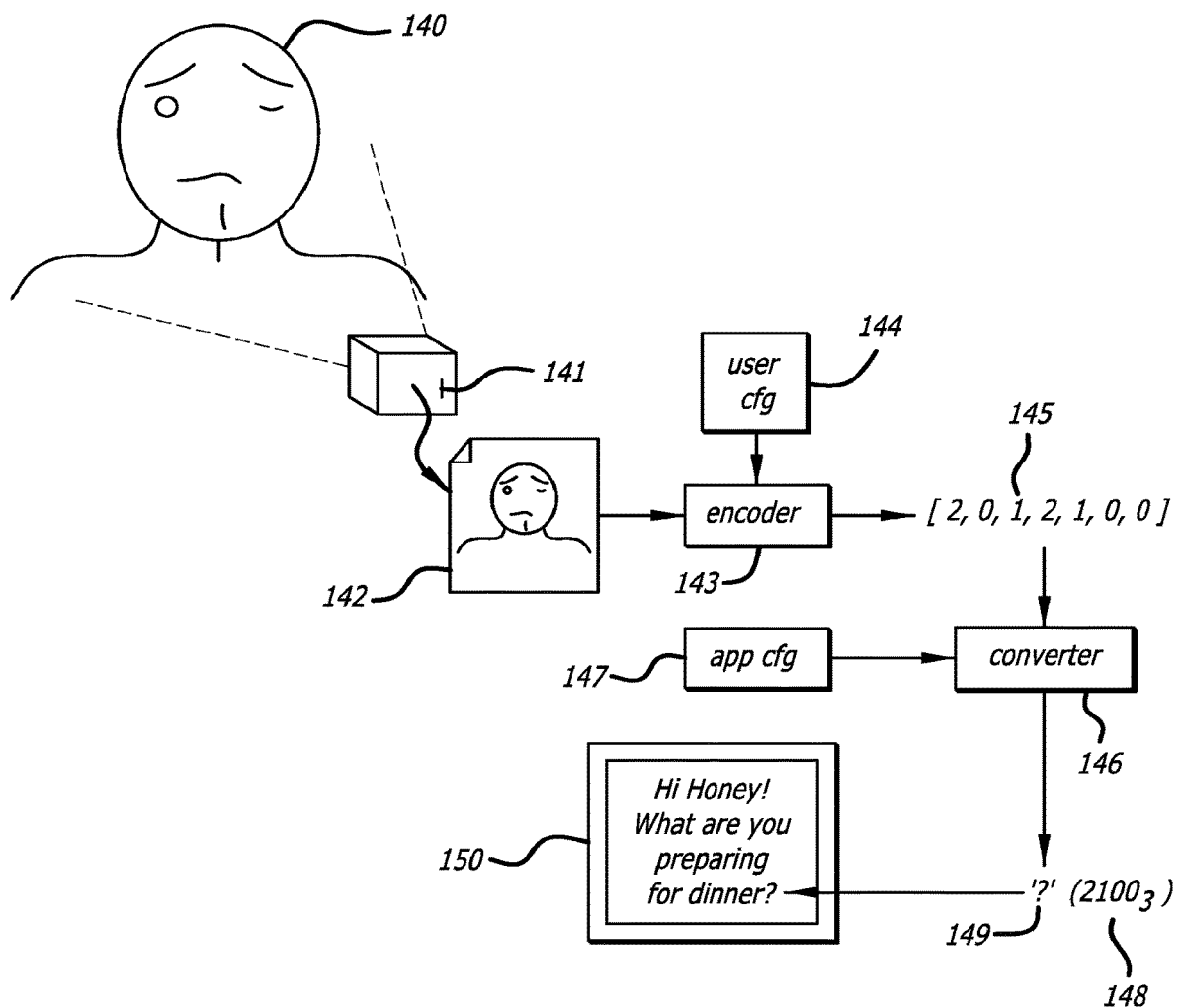

FIG. 7 is an illustration of an exemplary embodiment of the present disclosure. A user is generating text (e.g. text messages) using only transpositions of select components of the geometry of his face, head, neck and shoulders.

Figure 8:
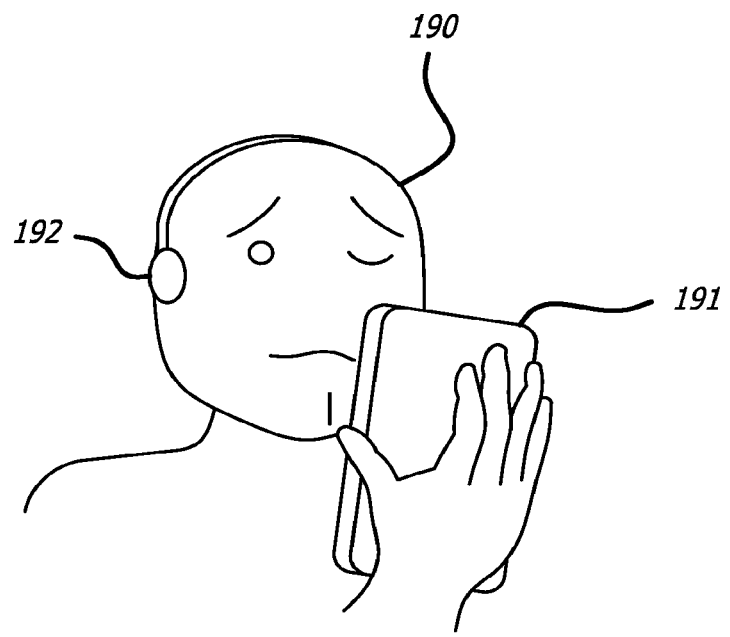

FIG. 8 is an illustration of a user using an exemplary embodiment of the present disclosure, in which the device is similar to a smartphone in size.

Figure 9:
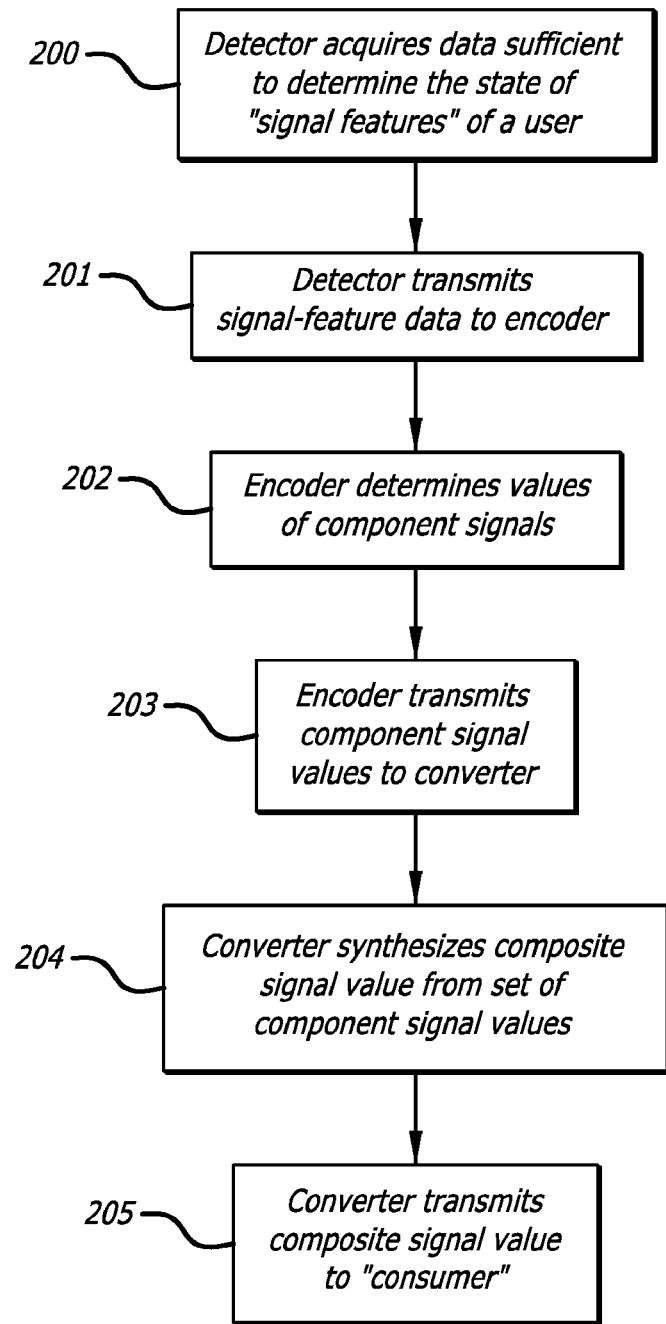

FIG. 9 is a flow chart illustrating some of the steps executed by an exemplary embodiment of the present disclosure so as to enable a user to input commands and/or data to the embodiment, its operating system, and/or to an application being executed within the embodiment (i.e. to a "consumer") through the generation of "signals." The consumer then processes each composite signal value.

Figure 10:
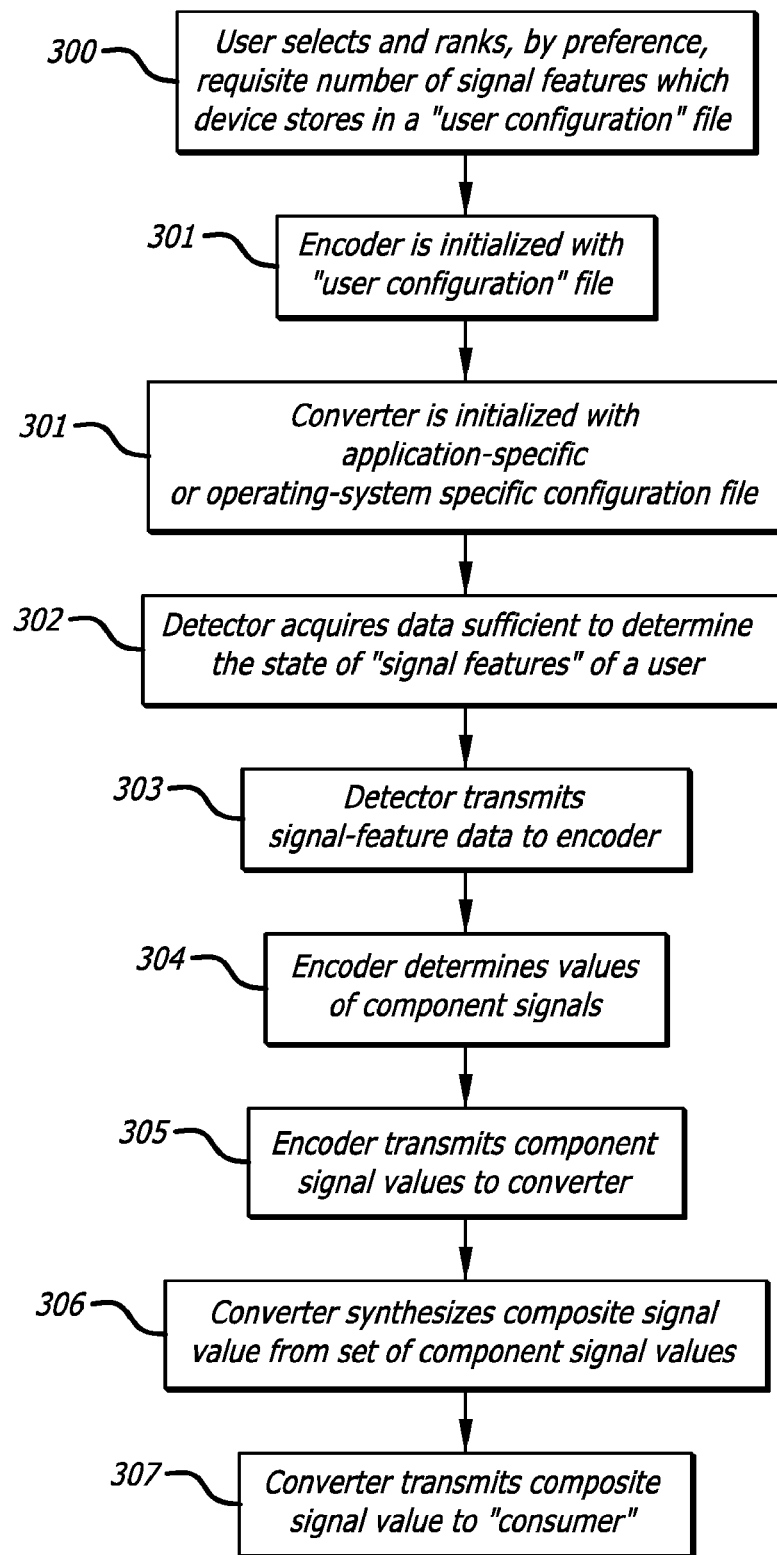

FIG. 10 is a flow chart illustrating some of the steps executed by an exemplary embodiment of the present disclosure so as to enable a user to input commands and/or data to the embodiment, its operating system, and/or to an application being executed within the embodiment (i.e. to a "consumer") through the generation of "signals." This embodiment allows a user to customize the encoder, through its initialization with a file specifying user preferences, e.g. specifying which signal features the user prefers.

FIG. 11(FIGS. 11_1, 2, 3 and 4) illustrates the differences between a "face tracking," "eye tracking" and/or "retinal tracking" system and the present disclosure. As illustrated in FIGS. 11_1 and 11_2 a change in the orientation of a user's face, body and/or "direction of gaze" is sufficient to alter the value (e.g. the horizontal (y) screen coordinate of a cursor) input to the system in response to the alteration of the user's appearance from the system's perspective.

By contrast, as illustrated in FIGS. 11_3 and 11_4, a change in the orientation of a user's face, body and/or "direction of gaze" is not sufficient to alter the value generated within an exemplary embodiment of the present disclosure with respect to a spatial configuration of the user's face and/or body—only an alteration in the spatial configuration of the user's face and/or body, relative to the user himself, can alter the value encoded therein.

FIG. 12 (FIGS. 12_1, 2, 3 and 4) illustrates the differences between a "face tracking," "eye tracking" and/or "retinal tracking" system and the present disclosure. As illustrated in FIGS. 12_1 and 12_2 an alteration in the orientation of a user's face and/or body, relative to the retinal-tracking system and/or its camera, if matched by a "complementary" alteration in the "direction of gaze", can result in the specification of the same value (e.g. the horizontal (y) screen coordinate of a cursor).

By contrast, as illustrated in FIGS. 12_3 and 12_4, a change in the spatial configuration of a user's facial and/or body parts, relative to the inherent frame of reference of the user's body, will always result in the specification, by an exemplary embodiment of the present disclosure, of a different value (unless neither configuration specifies a valid code, in which case they will both be equally insubstantial).

FIG. 13 (FIGS. 13-1, 2, 3 and 4) illustrates the invariance in the values interpreted by an exemplary embodiment of the present disclosure in response to a user moving relative to the embodiment and/or to its camera(s). The exemplary embodiment associates the same value with the unchanging spatial configuration encoded on the face of the user despite the user's movement through the field of view of the embodiment and/or its camera(s).

FIG. 14 (FIGS. 14_1,2) illustrates the invariance in the values interpreted by an exemplary embodiment of the present disclosure in response to accelerations of the user, either in absolute terms (i.e. relative to the Earth) or in relative terms (i.e. relative to the embodiment, device and/or its cameras). A "head-orientation-tracking" system like the one illustrated in FIG. 14_1 will alter the value(s) input to the system, and/or the system's interpretation of those values, in response to the acceleration (absolute and/or relative) of the user, his head, and/or the system, device and/or its cameras.

By contrast, an exemplary embodiment of the present disclosure generates input solely in response to the spatial configurations (of the face, head, body, etc.) generated by the user with respect to the user's inherent, bodily frame(s) of reference. Therefore, with respect to this exemplary embodiment, an acceleration (absolute and/or relative) of the user, his head, and/or the embodiment, and/or its cameras, will not alter the value generated, nor its subsequent interpretation, by the embodiment, if the spatial configuration of the user's face, head, body, etc., remains constant.

FIG. 15 (FIGS. 15_1, 2, 3, 4, and 5) illustrates the invariance in the values generated and/or interpreted by an exemplary embodiment of the present disclosure in response to a motion, even to a "reciprocating" motion, of the user, the user's face, or any other body part(s) of the user, with respect to the embodiment and/or its sensor(s).

Figure 16:
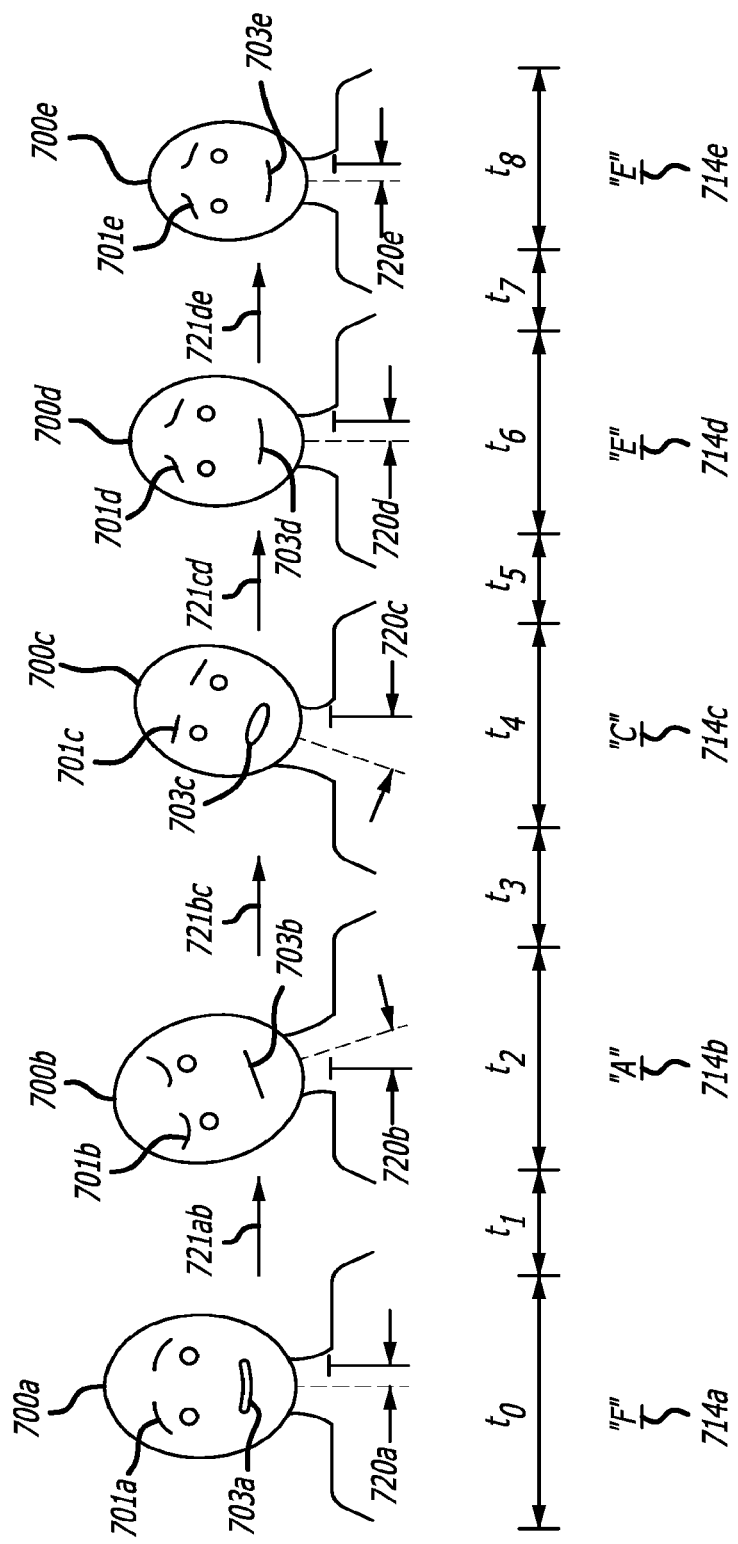

FIG. 16 illustrates a user's generation of a sequence of values with respect to the present disclosure.

Figure 17:
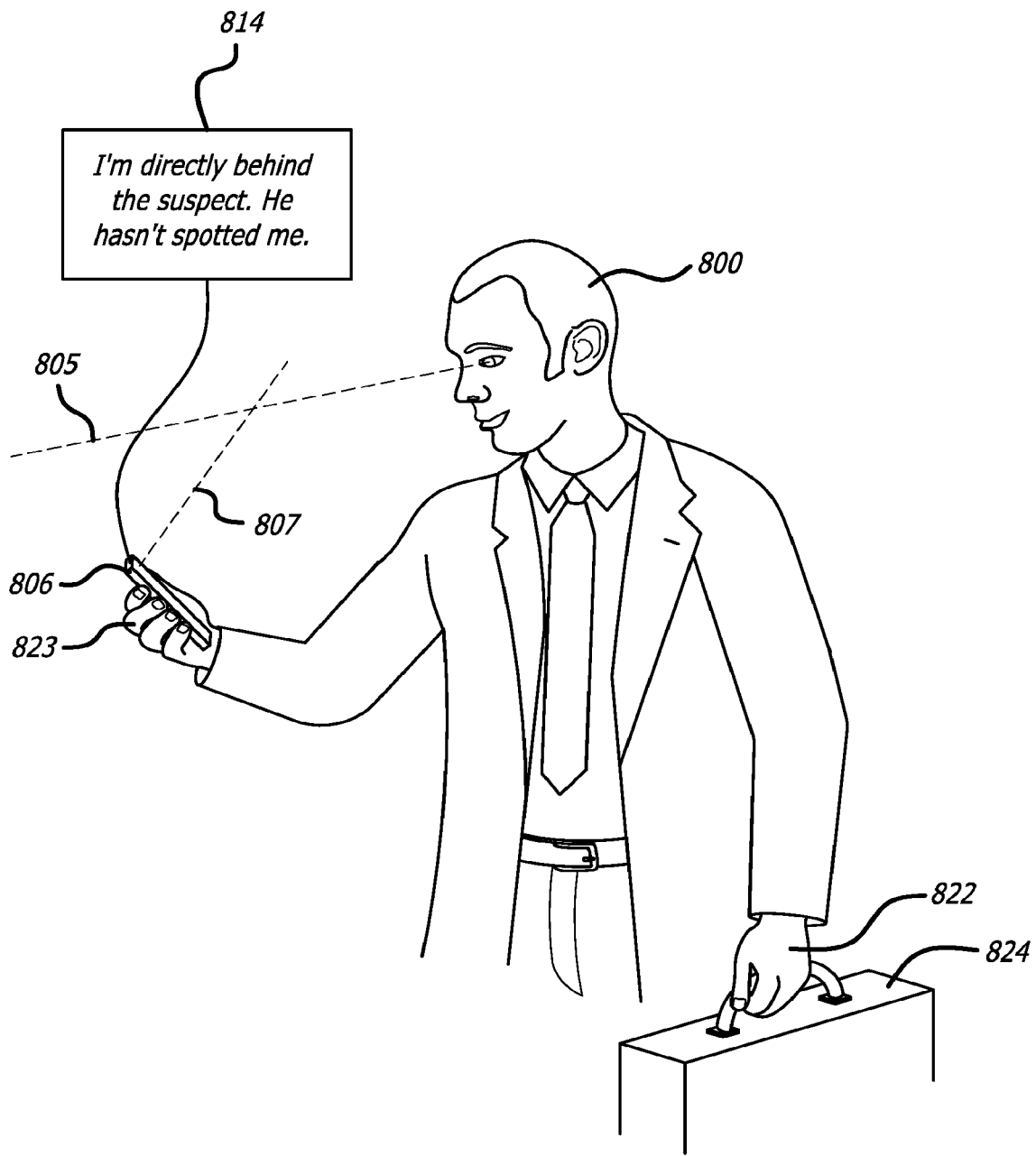

FIG. 17 illustrates the utility of an exemplary embodiment of the present disclosure.

Figure 18:
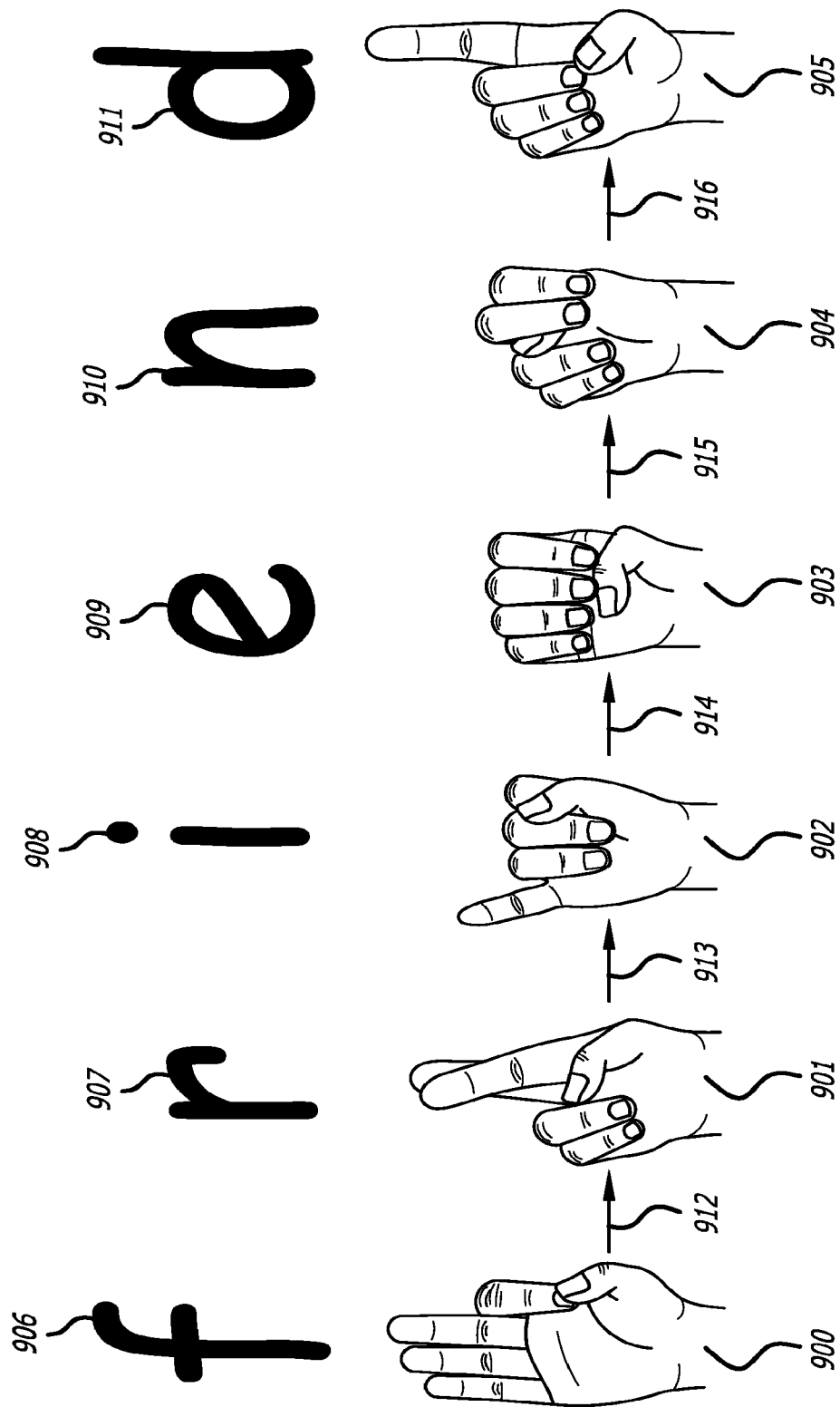

FIG. 18 illustrates the communication of the letters that spell the word "friend" through the use of the American Sign Language. The signs illustrated are generated and communicated through the presentation of "static" (i.e. unmoving, unchanging) hand configurations.

FIG. 19 (FIGS. 19_1, 2, 3, 4, 5, 6, 7, and 8) illustrates the communication of eight different words through the use of the American Sign Language. The signs illustrated are generated and communicated through the presentation of "dynamic" (i.e. moving, fluid) hand configurations for which the presentation of any static portion violates the protocol and would be expected to prevent its understanding by a third party.

Figure 20:
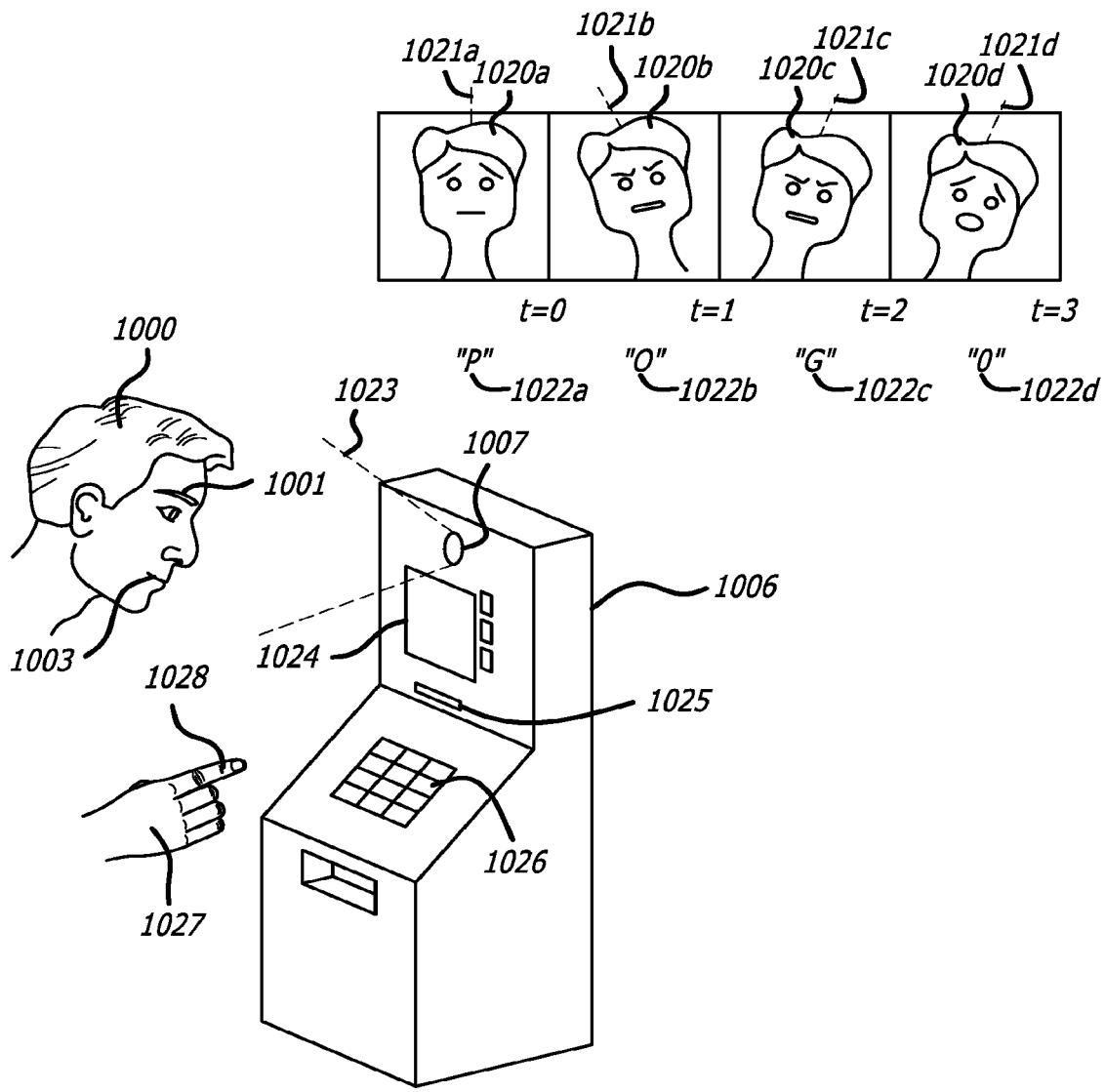

FIG. 20 illustrates an ATM embodiment of the present disclosure in which a customer communicates his password, or a portion thereof, to the embodiment through alterations in the geometry of his face, head, neck, and/or shoulders.

Figure 21:
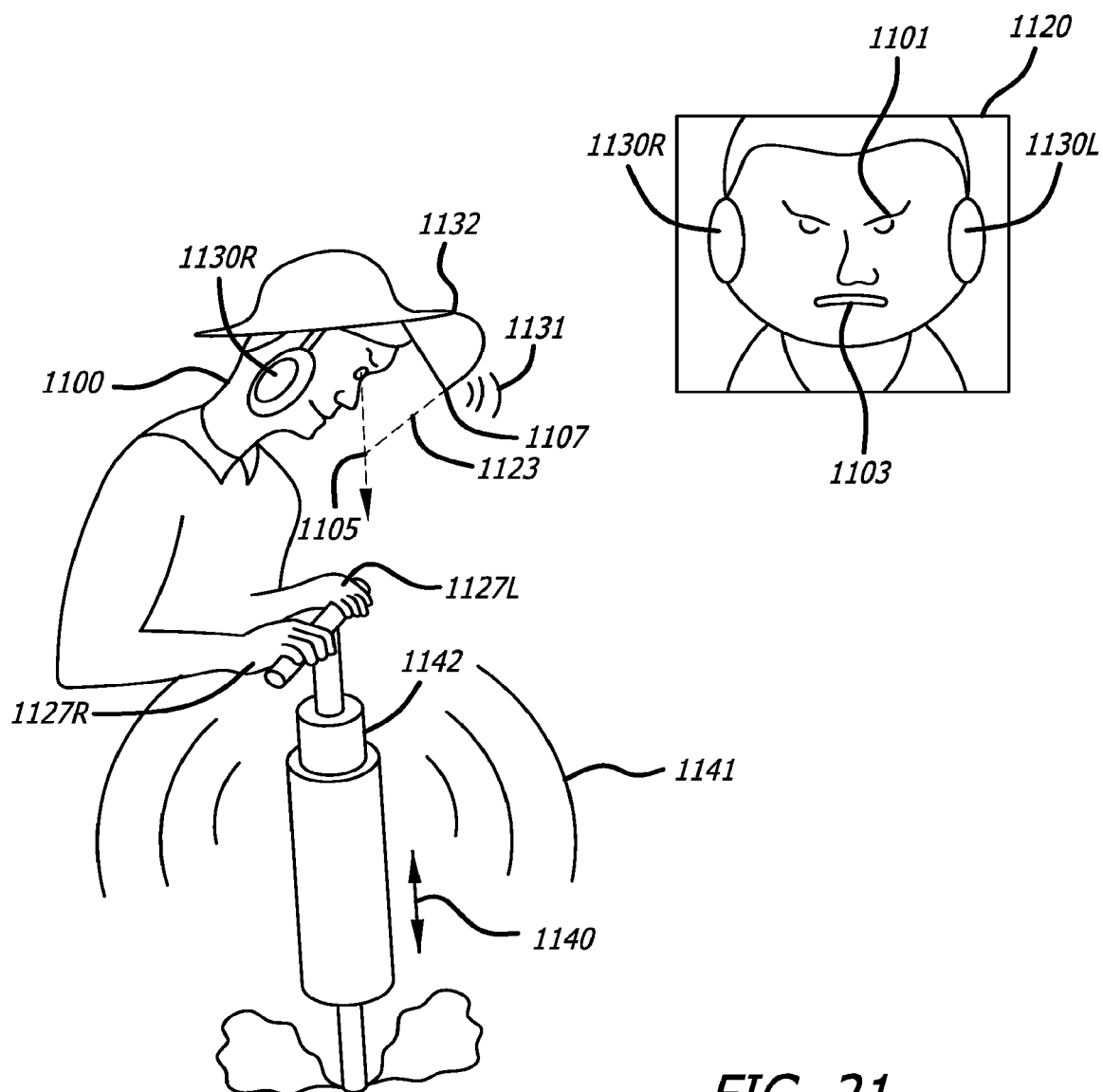

FIG. 21 illustrates an embodiment of the present disclosure in which a customer is communicating with a third party (e.g. another person) by means of symbolic values encoded by him through changes in the geometry of his face, head, neck, and/or shoulders, thus being able to communicate to the third party from within an environment so noisy that vocal communication would not be understood by the other party.

Figure 22:
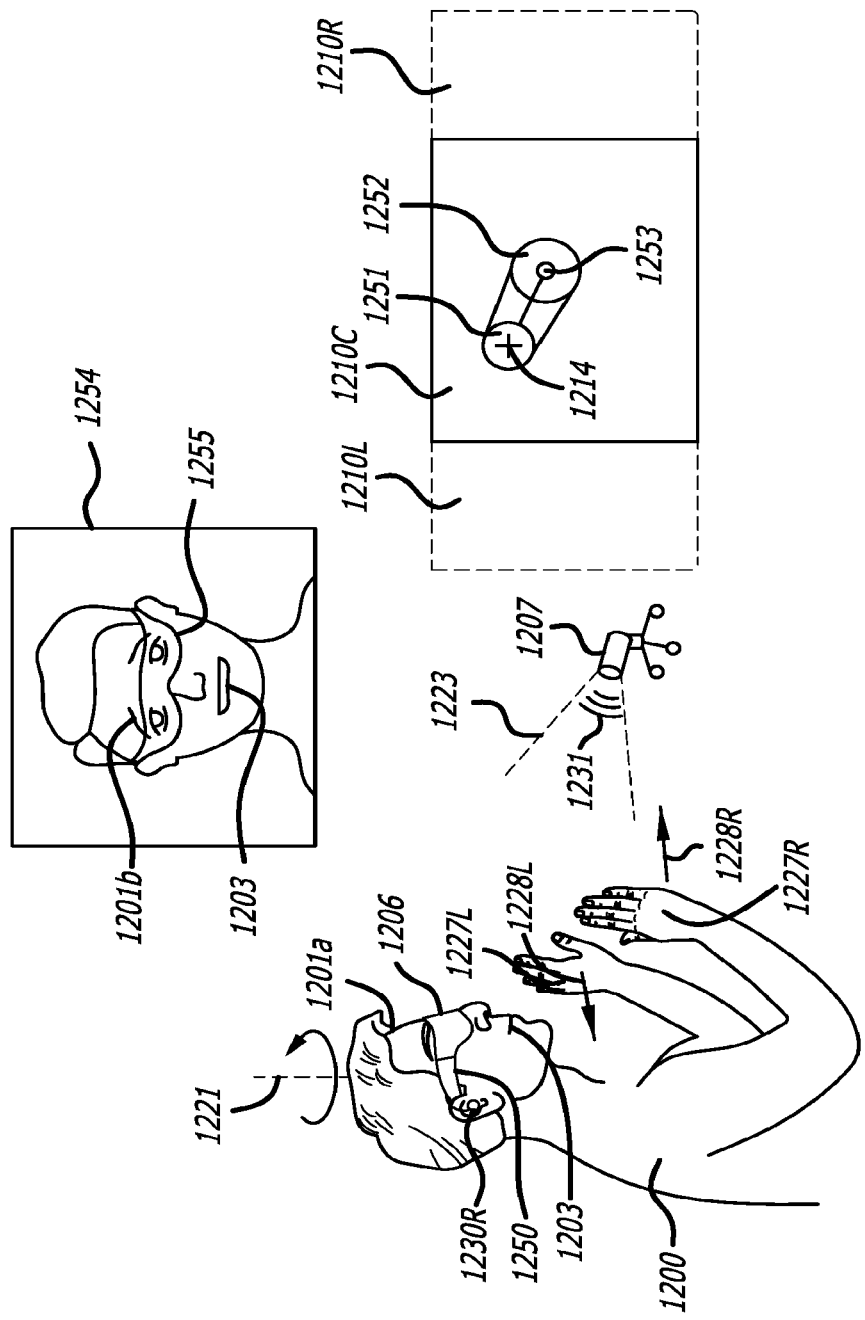

FIG. 22 illustrates an embodiment in which an artist is composing a digital image through the issuance to the embodiment of color values encoded by him through alterations to the geometry of his face, head, neck, and/or shoulders. He is also using gestures in order to simultaneously control the motion of a virtual paintbrush.

FIG. 23 illustrates an embodiment in which a gamer is adjusting parameters appropriate to his control of his virtual player within the game through alterations to the geometry of his face, head, neck, and/or shoulders.

V. DETAILED DESCRIPTION OF THE DISCLOSURE

A. Introduction

The present disclosure relates to a computer system architecture and design that allows alterations to the geometry associated with the head, neck and/or upper torso of a user, and/or other person or persons, to be used as a means of communicating and/or inputting values to a computerized device and/or software being executed therein. The present disclosure includes the detection and quantification of specific components or aspects of such altered geometries, the nervous innervations that cause them, and/or the consequences of them (e.g. localized changes in blood flow). Once detected, each such specific component of the overall geometrical configuration is measured and associated with a "score". While each individual score may be used directly as input to the processor of the computer, it would generally be preferable to transform the complete set of scores into a single digital value that the processor can then interpreted as a command or data value, e.g. like an ASCII code.

The system disclosed herein facilitates a user's "direct" input of "discrete" values to that system. Unlike systems described in the prior art, a number of embodiments of the present disclosure provide a user with the ability to input discrete "user-understood" and "user-intended" values to such embodiments without the use or involvement of the user's hands or voice, and without regard to the user's position and/or motion relative to that embodiment. Moreover, a number of embodiments of the present disclosure provide a user with the ability to input discrete values to such an embodiments without the user's access to, perception of, nor manipulation of, a user interface (e.g. a "virtual" keyboard displayed by an output device) dedicated to supporting the specification, composition, and/or submission, of such values.

With respect to an example embodiment of a system herein, coded signals deliberately manifested by a user, by means of contractions and/or relaxations of specific muscles and/or muscle groups on the user's face, head, neck, and/or shoulders, are detected by the exemplary system. The degree to which the exemplary system determines that each target muscle and/or muscle group is contracted is quantized to one of two or more numeric values, indices and/or their equivalent(s). The individual quantized muscle-specific numbers are combined in a pre-determined, and/or a pre-specified manner, in order to create a comprehensive "composite" number which the exemplary system then translates to a specific embodiment- and/or application-specific "value." The resulting "value" might represent a specific alphanumeric character, a particular word, an emoji, a particular color, a texture, a specific musical note, chord, and/or tone, etc.

A number of embodiments of the present disclosure provide a user with an alternate, and/or an additional, channel through which, and/or with which, the user may control, and/or interact with, a computerized device. This is a novel user-controlled channel for the input of user-specified values to a computerized system and/or to one or more applications being executed thereon.

1. Potential Embodiments

Exemplars of the system herein include, but are not limited to, the following:

while a user of an exemplary embodiment of the present disclosure herein uses:
both hands for a different purpose, or is paralyzed and/or lacking in hands and/or fingers;
his vision to observe something other than the system's output display (if any), or is visually-impaired and/or blind; and,
his voice to communicate with someone or something other than the system, or is lacking the ability to speak, or while wishing to avoid using his voice;

that user may also, by means of his selective contraction of appropriate muscles of his face, head, neck, and/or shoulders:

specify and/or control a parameter, attribute, and/or setting, of the exemplary embodiment (e.g. a color, a dimension, a rate, a texture, etc.);

specify and/or compose text (e.g. for use within a document, a text message, a chat utility, etc.)

specify a color (e.g. for use within a graphic arts and/or image creation and/or editing application)

specify a musical note, tone, chord, tempo, etc. (e.g. for use within a music creation, editing, sharing and/or streaming application)

specify a password and/or passphrase used to gain and/or maintain access to the exemplary embodiment, such as when the embodiment also provides the functionality of an "automated teller machine" (ATM), a "point of sale" (POS) terminal, an automated airport ticket and/or boarding pass (ATB) dispenser, etc.

specify a message, such as by a hearing-impaired user (who may have deficits in pronunciation due to her hearing loss), especially, although not exclusively, into a portable embodiment which would then clearly speak the specified words so as to facilitate that user's oral communication by the hearing person or people with which the hearing-impaired user is trying to communicate;

is specify a message, such as by a person suffering, and/or or recovering from, damage to a part of his vocal apparatus (e.g. the larynx, the tongue, etc.), for example, when the exemplary embodiment is a modified phone, which would then speak the specified words so as to produce a maximally intelligible oral rendition of the specified message to the other party (e.g. at the other end of the phone line);

specify a message, such as by a person in a noisy environment who is operating a tool requiring the use of both hands but wishes, or needs, to communicate to another person or system a textual, and/or simulated oral message, and/or stream of such messages;

specify a phone number to be dialed, such as by a person who is visually-impaired and/or blind, thereby initiating a call through an exemplary embodiment that includes the capabilities and functionality of a phone;

navigate the directory structure of the exemplary embodiment, such as by a quadriplegic unable to consciously control any muscles in his body other than those on his face, and perhaps unable to speak coherently enough to control such a computerized device orally due to the distortions introduced as a consequence of his reliance upon a ventilator;

issue commands (e.g. "reduce speed"), requests (e.g. "use the air conditioning to reduce the cabin temperature"), instructions (e.g. "prioritize the conservation of fuel"), and/or parameters (e.g. a destination)) to the exemplary embodiment that controls, in full or in part, the operation (e.g. steering, speed, braking) of a vehicle, e.g. when the user is a user, driver, and/or passenger of the vehicle;

navigate within and among the virtual and/or symbolic directory structure of the exemplary embodiment (such as when the embodiment also serves as a personal computer, a computerized television, a gaming system, a database, a server, etc.), e.g. allowing the user to gain virtual access to a particular directory and/or "folder", and/or to initiate the opening and/or editing of a file, and/or to execute or launch an application or program, and/or to control the playback and/or display of media;

issue commands and/or requests, such as when the user is an occupant of a building, for example, when the user's facial codes are visible to one or more cameras in communication with, or a part of, the exemplary embodiment, and, for example, when the exemplary embodiment constitutes a centralized environmental-control system, and when the cameras are mounted on the walls and/or ceiling of the building, e.g. one occupant might request an increase in the ambient temperature by communicating the facial code(s) that specify the message "too hot", and another might request a decrease in the ambient light level by communicating the facial code(s) that specify the message "too bright";

set and/or configure local and/or private settings in an exemplary embodiment that provides the functionality of a gaming environment while the user is simultaneously controlling aspects of the game play with her hands, monitoring game-related events on an output device, and communicating strategic comments to other game players orally;

control a game, and/or other entertainment program, executing with the exemplary embodiment wherein the user's issuance of facial codes, and the resulting generation of encoded values, is an integral part of the game play and/or experience, e.g. a game in which music is generated by the user and scored for quality and originality;

submit data to the exemplary embodiment, such as when the user is a medical professional, and wherein the data is related to symptoms, treatments, measurements (e.g. temperature), diagnoses, and/or prognoses, of patients generated, discovered, and/or communicated during the examination and/or treatment of those patients by the medical professional—especially when the medical professional is wearing protective garb that interferes with his dexterity and oral clarity, such as while treating patients in areas contaminated with virulent pathogens (e.g. the Ebola virus);

submit data to the exemplary embodiment, such as when the user is a medical professional, wherein the data is related to symptoms, measurements, diagnoses, and/or prognoses, of a patient generated, discovered, and/or communicated during the examination of that patients so as to avoid alarming the patient through a premature disclosure of preliminary but potentially serious observations;

is control media, and/or the dynamic composition of textual information, within the exemplary embodiment, such as when the user is a teacher in a classroom setting, wherein the teacher's manual control and/or issuance of spoken commands would create a distraction and an impediment to the ability of her students to concentrate on the lesson(s) being taught;

control an exemplary embodiment which functions as a robot, especially one designed to facilitate the user's ability to simulate fantasies, in the absence of speaking or manual control when such speaking or manual control would disrupt the fantasy being simulated; and, control an exemplary embodiment which functions as a robot, especially one that must be controlled from a distance in a noisy (e.g. factory) environment by an operator whose hands and attention must be dedicated to the control and manipulation of other (potentially hazardous) objects.

An exemplary embodiment of the present disclosure utilizes one or more sensors to detect, and provide the basis for measuring, the extent to which a user moves, contorts, and/or otherwise modifies, specific aspects of the geometry of his face, head, neck, and/or shoulders. Through his innervation of the appropriate nerves, and his contraction of the appropriate muscles, the user is able to create distinct signals that the embodiment is able to recognize, measure, and uniquely identify. The embodiment will ignore any geometries that it fails to recognize. The embodiment then translates each recognized user-specified signal into a symbolic value appropriate to the embodiment's design, to the operation of a body of computer codes being executed in conjunction with the operating system of the embodiment (e.g. a text editor), and/or to the work which the user of the embodiment is trying to accomplish and/or complete.

The determining means, quantizing means, converting means, mapping means, and processing means, each involve specialized manipulations of digital data, and require appropriate special computer instructions/codes capable of accomplishing those manipulations. Those computer codes can be executed on a single processor, e.g. in a serial fashion. Or they can be executed on two or more processors, allowing for the possibility that some or all of the manipulations can be executed in parallel (i.e. allowing a stream of data to move from processor to processor so that multiple streams can be processed at the same time).

2. Innervation

A nerve is "innervated" when an exchange of ions across its cell membrane transmits an electrical current along at least one axon of the nerve.

3. Muscle Contraction

When a muscle contracts its length typically shortens, at least on cross-sectional area within the muscle typically increases, and it tightens. A muscle contracts in response to the innervation of an appropriate nerve. The contraction involves the release of calcium ions and is associated with an electrical voltage, as may be detected by an electromyograph.

4. Conversion of "Relative Translocations" into "Symbolic Values"

Exemplary embodiments of the present disclosure detect and measure changes in the structure and/or shape of a user's face, head, neck, and/or shoulders. The parts of a user's face, head, neck, and/or shoulders, that these embodiments monitor and measure include parts that a user can translocate (i.e. "source parts") relative to at least one other part (i.e.

"reference parts"). The translocation of each source part is measured relative to at least one corresponding reference part (i.e. "relative translocations"). The parts monitored and measured by one embodiment might differ from the parts monitored by one or more other embodiments.

Exemplary embodiments of the present disclosure determine the degree to which a user translocates one or more specific parts of a user's face, head, neck, and/or shoulders. These embodiments will respond to their determination of the collection of measurements that are characteristic of a specific and characteristic set of part-specific translocations that characterize a user's face, head, neck, and/or shoulders at a particular moment in time, by generating a "value".

Each value generated by one of these embodiments in response to the embodiment's determination and/or generation of a particular collection of part-specific relative-translocation measurements will represent a symbolic entity that will processed, executed, and/or responded to, in a fashion characteristic of, and appropriate to, the purpose, function, design, and/or utility, of each embodiment and/or of an application or program being executed within each embodiment.

The set of embodiment- and/or application-specific "values" associated with each unique collection of part-specific relative-translocation measurements could include, but is not limited to: an alphanumeric character, a numeric character, a color (e.g. a specification of an RGB color value), an icon graphic, an embodiment- and/or application-specific command (e.g. "save file"), a word (e.g. "apple"), a phrase (e.g. "Best Regards, Joe Smith"), or any other data value that can be processed by an embodiment.

However, the parts of a user's face, head, neck, and/or shoulders, that an exemplary embodiment might monitor and measure, and the relative translocations of which will form the basis for the embodiment- and/or application-specific values that a user will thus specify, and which the embodiment will subsequently process, are not uniform.

Different users will have different faces, heads, necks, and shoulders. Therefore, when different users execute a same translocation, e.g. fully raising their eyebrows, the resulting measurements of the relative translocations will differ. In other words, source and reference parts of different sizes, geometries, and relative orientations, will be characterized by different measures of their relative translocations. Therefore, in order to standardize the part-specific relative-translocation measurements that constitute the basis for the generation of "values", exemplary embodiments of the present disclosure will "quantize" those measurements so that the same types of relative translocations, e.g. "moving one's eyebrows fully up", "slightly opening one's mouth", etc., will result in part-specific relative-translocation measurements that will lead to the generation of the same values.

5. Measurable Parts

Exemplary embodiments of the present disclosure use external features of a user's face, head, neck, and/or shoulders as source and reference parts. These source features, and their corresponding reference features, may include, but are not limited to, the following:

TABLE 1

| Source Part | Reference Part | Translocation Type |
|---|---|---|
| (sagittal plane of) head | (transverse plane of) shoulders | left-right tilt angle |
| (coronal plane of) head | (coronal plane of) shoulders | forward-backward tilt angle |

TABLE 1-continued

| Source Part | Reference Part | Translocation Type |
|---|---|---|
| (sagittal plane of) head | (sagittal plane of) shoulders | left-right rotation angle |
| left eyebrow | left canthus | separation distance |
| right eyebrow | right canthus | separation distance |
| left upper eyelid | left lower eyelid | separation distance |
| right upper eyelid | right lower eyelid | separation distance |
| upper lip | lower lip | separation distance |
| left and right cheeks | n/a | concavity-convexity |

Exemplary embodiments of the present disclosure use muscles within a user's face, head, neck, and/or shoulders as source parts. There are no reference parts as the translocations are measured relative to the degree of muscular contraction.

Exemplary embodiments of the present disclosure use nerves within a user's face, head, neck, and/or shoulders as source parts. There are no reference parts as the translocations are measured relative to the degree of nerve-specific innervation.

6. Differs from Retinal Tracking

A number of embodiments of the present disclosure differ from "retinal-tracking" systems in which a user controls the position of a cursor on a display device by looking at the desired cursor position, and perhaps controls the simulated "clicking" of a mouse button at any particular cursor position. Such retinal tracking systems involve, by definition, user control of an element of a user interface. And, the utility and use of a retinal-tracking system would not be possible in the absence of the user interface displaying the cursor to be controlled.

By contrast, a number of embodiments of the present disclosure do not require a user interface. And, if an embodiment of the present disclosure were used to control a user interface it could only do so to the extent that the control exerted were mediated through the specification by the user of discrete values (e.g. the letter "a", the number "81", the color "blue", etc.) whose definitions were unambiguous and fully understood by, and consciously generated by, the user. This is contrary to the experience of a user controlling a cursor position by means of retinal tracking (or through the use of a mouse) wherein that user does not typically, if ever, know the coordinates of a current cursor position (in terms of the coordinate system of the display device) much less the coordinates of the location on the display device to which he is directing the cursor.

7. Differs from Detection and Interpretation of Bodily Motions

A number of embodiments of the present disclosure differ from systems in which a user controls a user interface in relation to detected motions and/or accelerations of the user, especially when those motions and/or accelerations of the user are relative to the system, and/or its sensor(s) (i.e. and not necessarily relative to the user himself). For instance, a system that would modify a display so as to adjust the perspective of a user within a "virtual world" in response to movements and/or accelerations of the user's head and/or eyes would operate by matching a change in a user's line-of-sight in the real world, with the user's line-of-sight in the virtual world (e.g. to facilitate a user's use of, and/or improve a user's satisfaction with, the exploration of a virtual world through images displayed to the user's eyes from inside specially equipped goggles or glasses). However, in this case, the user is not generating specific muscle-mediated codes in order to achieve that synchrony of perspectives within the real and virtual worlds. In fact, the user of such a system might not even be aware of the mechanism by which that synchronization were implemented, much less have knowledge of, nor the means to consciously alter, the signals sent from the system's sensor(s) to the part of the system responsible for adjusting the perspective of the output device.

8. Differs from Detection and Interpretation of "Gestures"

A number of embodiments of the present disclosure differ from systems that respond to user-executed "gestures". Such gesture movements are typically interpreted by such a system relative to their direction with respect to the system and/or its sensor(s).

By contrast, a number of embodiments of the present disclosure detect and respond only to static configurations of specific muscles and/or muscle groups irrespective of the movement of the user and/or any of the user's body parts. The muscular configurations that encode numbers, and their associated context-specific values, in these exemplary embodiments are defined relative to an "instant" in time. And, by definition, motion must exist, and be detected relative to, "intervals" of time—not "instants".

9. Differs from Detection and Interpretation of "Sign Language"

A number of embodiments of the present disclosure differ from systems that respond to "signs" executed by users through hand-mediated signals (i.e. by means of "signs" characteristic of a "sign language" such as the "American Sign Language (ASL)". By contrast, a number of embodiments of the present disclosure detect and respond to configurations of specific muscles and/or muscle groups located on the face, head, neck and/or shoulders, only. These exemplary embodiments explicitly avoid the involvement of a user's hands so that the user is free to use each of her hands for some other purpose, including, but not limited to, the manipulation of a keyboard, mouse, joy stick, etc.

Also, some of the signs used with a sign language, such as ASL, involve repetitive motions. For example, within ASL, the following signs are dependent upon a defining, and characteristic, motion, and cannot be conveyed in the absence of such a motion: "afraid", "sad", "please", "sorry", "more", "hello", "goodbye", "thanks", "yes", "no", "deaf", "hearing", "people", "friend", "they", etc. Even the letters "j" and "z", and the names of the days of the week (e.g. "Monday", "Tuesday", etc.), cannot be properly executed in the absence of specific characteristic motions of the hand(s). By contrast, a number of embodiments of the present disclosure detect and respond only to static configurations of specific muscles and/or muscle groups irrespective of the movement of the user and/or any of the user's body parts.

10. Differs from Physically-Manipulated Input Devices

A number of embodiments of the present disclosure differ from systems that require users to specify values (e.g. alphanumeric characters) through their interaction and/or manipulation of physical devices, and/or "peripherals", such as keyboards, touch screens, track balls, mice, etc.

Through the pressing and releasing of keys on a keyboard users can enter specific discrete values (e.g. the letters "g", "r" and "w", as well as others). A user's use of a keyboard to enter discrete values might be done in the absence of a user interface to provide feedback. However, a user interface is required if a user is to enter discrete values through the use and control of a cursor-control device, such as a track ball, mouse, etc., or through the use of a substitute for a cursor such as a touch screen, since these devices require the user to select and/or "click" or "touch" a discrete value displayed on the interface display.

By contrast, a number of embodiments of the present disclosure do not require a user to manipulate a physical device or peripheral in order to specify discrete values. Nor do these exemplary embodiments require the availability or provision of a user interface, nor a display or output device of any kind.

11. Differs from Spoken Input

A number of embodiments of the present disclosure differ from systems that detect, interpret, and/or respond to, words spoken by users. A number of embodiments of the present disclosure are analogous to such orally-controlled systems in that discrete values may be input to the system in the absence of a user interface, and in the absence of any physical contact between the user and the system, e.g. through the user's touching, or pressing of keys on the system. However, unlike these "oral" systems, these exemplary embodiments do not require a user to speak, nor to make a sound of any kind, which is advantageous in many contexts and with respect to many potential uses.

12. An Additional Input Channel, not Necessarily and Exclusive One

In addition to allowing a user to communicate encoded values by means of facial expressions (i.e. by means of muscle contractions, and muscle-mediated alterations to the shapes and/or relative positions of features on the face, head, neck and/or shoulders of the user), a number of embodiments of the present disclosure can incorporate additional, traditional input channels such as a keyboard, a mouse, a touch screen, a detector of user speech, etc. Embodiments of the present disclosure need not operate in the absence of "traditional" input channels described in the prior art. On the contrary, they may incorporate the detection and translation of facially-encoded values into the embodiments as additional (rather than as the sole) channels through which users may interact with those embodiments.

13. Detection of Contraction-Encoded Signals

A number of embodiments of the present disclosure can detect contractions of target muscles and/or muscle groups in a variety of ways, and through the use of a variety of sensors and/or sensor types, including, but not limited to:

- visually, through the detection, by one or more cameras, of changes in the relative distances of various surface features of the head, face, neck, and/or shoulders, from each other and/or from one or more "landmark" features (such as the tip of the nose);
- visually, through the detection, by one or more cameras, of changes in the "shading" of the surface features and/or contours associated with a user's head, face, neck, and/or shoulders, that are indicative of changes in the height and/or shape of those features and/or contours;
- visually, through the detection of changes in the three-dimensional shape of a user's head, face, neck, and/or shoulders, wherein the three-dimensional shape is constructed on the basis of image data collected from one or more cameras;
- electrically, through the detection of contractions of the muscles and/or through the detection of the innervations that cause those contractions;
- through the detection of changes in shape, stretching and/or torsion by means of sensors that respond to stretching;
- magnetically, through the use of sensors that detect and/or measure the changes in magnetic fields associated with the electrical fields that arise in association with muscle contractions and/or the innervations of the nerves responsible for those contractions; and, thermally, through the visual detection of changes in the irradiance of heat from the skin of a user with a camera sufficiently sensitive to infrared wavelengths.

14. One or Many Values

A user of an example of a system herein might communicate many contraction-encoded values to the exemplary system, e.g. when composing text or music. Or a user might communicate a single value. For instance, when used in combination with a security system based on facial recognition, an exemplary system might display a letter, number or color to a user, and that user might then "parrot" that code back to the system by encoding it through the appropriate contractions of the requisite muscles on her face, head, neck and/or shoulders. This would allow an exemplary secure system to have greater confidence that an image of the user's face, used to establish, at least in part, the identity of the user, was in fact genuine and not a stolen image of the genuine user being submitted by a hacker so as to defeat the security of the exemplary system and steal the money and/or identifying information of the genuine user.

15. Differentiation of Contiguous Values

A number of embodiments of the present disclosure detect and interpret (i.e. convert, translate, map, etc.) instantaneous configurations of differentially (i.e. incrementally, variably, distinct, etc.) contracted specific muscles, and/or muscle groups. Such exemplary embodiments might distinguish each value-specific configuration of muscular contractions, within a series of "contiguous" (i.e. temporally-ordered and temporally-distinct) value-specific configurations, from its temporally adjacent (i.e. preceding and succeeding) configurations by means of a number of different methods, and/or in a number of different ways, including, but not limited to:

Each Unique Value
responding to, and/or processing, (i.e. converting to an embodiment- and/or application-context-specific value) each recognizable and valid configuration of contractions detected, measured, and/or recognized within a specific set of face, head, neck, and/or shoulder muscles that occurs within any particular image in a series or stream of images produced by at least one of the embodiment's cameras, perhaps avoiding the redundant processing of contraction-encoded values until after a new value, or the absence of a valid value, has been detected;

Each One Persisting for at Least a Specific Duration
responding to, and/or processing, (i.e. converting to an embodiment- and/or application context-specific value) each recognizable and valid configuration of contractions detected, measured, and/or recognized within a specific set of face, head, neck, and/or shoulder muscles that is maintained by the user for at least a specific minimum period of time (e.g. for a specific number of contiguous images within a stream of images) and not repeating the response to, and/or processing, of that same contraction-encoded value until a different, or until an invalid, configuration of contractions is detected, measured, and/or recognized; and, Each One Occurring after at Least a Specific Latency
responding to, and/or processing, (i.e. converting to an embodiment- and/or application context-specific value) each recognizable and valid configuration of contractions detected, measured, and/or recognized within a specific set of face, head, neck, and/or shoulder muscles that occurs after, but not before, a certain minimum interval since the detection of the prior value, but signaling an error after a certain maximum interval since the detection of the prior value.

16. Feedback from System

An exemplary embodiment of the present disclosure herein might provide feedback to a user issuing muscular-contraction-encoded values in a variety of ways, including, but not limited to, the following:

by displaying at one or more locations on the screen of an output device, and/or graphical display, the value detected by the embodiment (e.g. the letter "e", the color "green", etc.);

by executing a change in, or behavior of, the embodiment that is detectable to the user, such as by issuing an audible musical note; by changing the color of one or more pixels on a graphic display, and/or on a projected image; by changing the location (relative to the user, the Earth, and/or to a part of the embodiment itself) of the embodiment, and/or a part thereof;

by blinking, one or more times, an inconspicuous light of one color (e.g. green) when a valid value has been detected on the face, head, neck, and/or shoulders, of the user, and has been received by the embodiment, and, perhaps optionally, blinking a light of another color (e.g. red) in response to the detection of an invalid and/or inappropriate value; and, by repeating back to the user, e.g. by audible pronunciations of each value detected, such as "a", "b", "o", "u", "t", "about" . . . or "eight", "zero", "five", "four" . . . (as for a phone number to be dialed on behalf of the user).

An exemplary embodiment of the present disclosure might indicate to a user that it is ready to detect and process and/or execute values and/or instructions issued by the user, through the user's manifestation of muscular-contraction-encoded values, in a variety of ways, including, but not limited to, the following:

by displaying at one or more locations on the screen of an output device, and/or graphical display a message, status indicator, icon, color, cursor (of a specific shape and/or color), or other graphical element indicative of the embodiment's readiness;

by outputting an audible signal of readiness, such as a beep or buzz; and, by speaking the word "ready" (or some other word).

Specific muscular-contraction-encoded values might serve to control an exemplary embodiment of the present disclosure. For instance, specific values might be defined with respect to an exemplary embodiment that would permit a user to "control" a variety of embodiment functions, including, but not limited to:

ending the detection and processing of the preceding series of values;

initiating the composition of a new document, piece of music, graphic, etc.

deleting one or more of the prior values;

audibly speaking (e.g. reading back) the draft message;

saving the recently edited document, piece of music, graphic, etc.;

sending the recently composed text message;

hanging up the phone (i.e. ending the phone call);

and so on . . . .

17. One or Many Users

An exemplary embodiment of the present disclosure might search for, detect and process the values encoded via muscular contractions on the face, head, neck, and/or shoulders, of a single user. This would be a common limitation appropriate to many embodiments (e.g. those that convert contraction-encoded values into passwords and/or passphrases in order to validate user identities prior to granting them access to the embodiment).

However, another exemplary embodiment of the present disclosure might simultaneously search for, detect and process the values encoded via muscular contractions on the faces, heads, necks, and/or shoulders, of as many as multiple users. Such an embodiment might synthesize the individual values, encoded by the respective individual users, into groups of contemporaneous values. One embodiment might associate the values encoded by each particular user with music notes associated with a particular musical instrument. In this type of embodiment, a group of people might be able to generate music associated with the simultaneous playing of a variety of instruments. Such an embodiment might allow the pitch of the music output by the system with respect to each user's associated virtual instrument to be specified by the user(s) via their muscle-specific contractions. It might allow the loudness of the music output by the system with respect to each user's associated virtual instrument to be controlled by the degree to which each user's right hand is extended out from their respective chest. And, it might allow each user to adjust the timbre of the synthesize music that they contribute to the concert by adjusting the degree to which that user's left hand is extended out from his chest.

18. Steps Executed by the System

An exemplary embodiment of the present disclosure will detect, on the face, head, neck, and/or shoulders, of a user, the contractions, or lack thereof, of specific muscles and/or muscle groups. It will then measure and quantize those contractions, thereby translating raw analogue measurements, relative to a virtually continuous range of distances, into one of a muscle-specific number of gradations. For instance, the "lift" of a user's eyebrows might have a raw measured value expressed as real number (e.g. 18.3 mm, 17.9 pixels, 4 arcminutes, etc.), but be quantized to an integral number within an embodiment-specific and/or muscle-specific range (e.g. 2 in the range of 0 to 3). Each resulting quantized muscle-specific degree of contraction will then be combined so as to create a composite number within a specific range of such numbers (e.g. from 0 to 107, which would result from the combination of four quantized contraction measures having ranges of 0 to 1, 0 to 1, 0 to 2, 0 to 2, and 0 to 2, respectively).

For example, an exemplary embodiment of the present disclosure might execute the following steps in order to provide the disclosed functionality:

1. Receive a stream of images from a camera whose field of view may include a user of the system.

2. Attempt to locate within each image the face, head, neck, and/or shoulders, of a person (i.e. of the user).

3. Locate the face, head, neck, and/or shoulders, of the user found in the image.

4. Locate each of the points and/or features (i.e. "target muscles") on the face, head, neck, and/or shoulders of the user that will be associated with the user's specification of coded values.

5. Measure the extent to which each of the target muscles is contracted. Since the actual muscles are not directly visible, the embodiment may measure, with respect to each target muscle, or group of muscles, a corresponding and/or associated change in a visible feature characteristic of the user's face, head, neck, and/or shoulders. The types of features, as well as the feature-specific attributes, that an embodiment might measure, as proxies for the degrees to which the associated muscles are contracted, includes, but is not limited to, the following: a) the degrees to which the distance between those muscles' target features (e.g. an eyebrow) and their corresponding reference features (e.g. the outer corner of each eye) have changed; b) the degrees to which the angular orientations of those muscles' target features (e.g. the Sagittal plane of the head) and their corresponding reference features (e.g. the Transverse plane across the shoulders) have changed; and, c) the degrees to which the cross-sectional areas, the volumes and/or the shapes of those muscles' target features (e.g. the nares of the nostril) have changed.

The measurements of the proxy features, and feature-specific attributes, might correspond to measurements that would be expressed in terms of a variety of units, including, but not limited to: millimeters and/or pixels (for measurements of separation); angles (for measurements of angular orientation); square millimeters (for measurements of area); and, cubic millimeters (for measurements of volume).

6. Quantize each muscle-specific measurement (or average of the measurements obtained with respect to a pair of correlated and/or equivalent target muscles or features, such as the eyebrows). Thus, each muscle-specific raw measurement would be converted (i.e. quantized) to an integral number between a muscle-, and/or feature-specific, minimal and a maximal value. For example, the degree to which a user's eyebrows are raised above, and/or lowered below, their resting positions, and perhaps corresponding to the millimeters of deviation above or below their resting positions), relative to the respective outer corners of the user's eyes, might be quantized into a value (averaged from the pair of eyebrows) that would range from 0 to 4, inclusive. In this example, 0 might correspond to fully lowered eyebrows, 1 might correspond to partially or slightly lowered eyebrows, 2 might correspond to the resting or relaxed position of the eyebrows, 3 might correspond to partially or slightly raised eyebrows, and 4 might correspond to fully raised eyebrows.

7. Combine the individual quantized muscle-specific numbers into a composite number. Each composite number will correspond to a unique, order-specific set of muscle-specific quantized numbers. For example, assume that we have two features (e.g. the eyebrows and head orientation). Assume that the positions of the eyebrows are converted/quantized into a number from 0 to 4, inclusive. Assume that the head can be tilted to the left, to the right, or not tilted, and are converted/quantized into a number from 0 to 2, inclusive (0=left tilt, 1=no tilt, and 2=right tilt). These two features will allow a user to specify 15 unique values. The definitions of these 15 unique composite values are shown in the table below:

TABLE 2

| eyebrow lift | head tilt | composite number |
|---|---|---|
| 0 | 0 | 0 |
| 0 | 1 | 1 |
| 0 | 2 | 2 |
| 1 | 0 | 3 |
| 1 | 1 | 4 |
| 1 | 2 | 5 |
| 2 | 0 | 6 |
| 2 | 1 | 7 |
| 2 | 2 | 8 |
| 3 | 0 | 9 |
| 3 | 1 | 10 |
| 3 | 2 | 11 |

TABLE 2-continued

| eyebrow lift | head tilt | composite number |
|---|---|---|
| 4 | 0 | 12 |
| 4 | 1 | 13 |
| 4 | 2 | 14 |

8. Convert the composite number into a "value" appropriate to the design and/or intended purpose of the embodiment, and/or to the design and/or intended purpose of the application executing with the embodiment. For instance, if the embodiment is a "graphical drawing" system (i.e. for the composition of graphical images), then each composite number would be converted into a corresponding color, such as illustrated in the table below:

TABLE 3

| composite number | color |
|---|---|
| 0 | white |
| 1 | light gray |
| 2 | dark gray |
| 3 | black |
| 4 | red |
| 5 | yellow |
| 6 | blue |
| 7 | green |
| 8 | orange |
| 9 | purple |
| 10 | cyan |
| 11 | violet |
| 12 | magenta |
| 13 | azure |
| 14 | brown |

9. Respond to the context-specific value in an appropriate manner. Such a response might include, but is not limited to: a) update the image by altering the value of at least one pixel in the exemplary embodiment's display (e.g. when the exemplary embodiment is a graphical drawing embodiment); b) update the document by changing or appending the value of at least one character within the memory containing the document's contents (e.g. in the text-editing embodiment's random-access memory); or, c) synthesize and output, via at least one speaker attached to the embodiment, a musical note, chord, tone, etc.

19. User-Specific Calibration of Contractions

With respect to the present disclosure, different users may have different ranges of motion, with respect to the movements of muscles, and associated features, on their faces, heads, necks, and/or shoulders. An exemplary embodiment of the present disclosure may measure and convert the contractions and movements of the targeted facial muscles and features using a consistent and/or constant standard of measurement and/or quantization. Other exemplary embodiments may afford user's the opportunity to demonstrate their range of contraction and/or movement with respect to embodiment-specific muscles and/or features. These exemplary embodiments can then use these user-specific ranges as the extremes against which they measure future "relative" degrees of contraction and/or movement.

20. Contractions, Distances, Areas, Volumes, Angles, Etc.

This disclosure makes reference to the detection and conversion of the degrees to which specific muscles and/or muscle groups are contracted. However, it should be understood that each such reference, unless clearly specified to the contrary, should be considered equally applicable in whole, or in part, to the detection and conversion of the degrees to which features (e.g. eyebrows) on the outer surfaces of a user's face, head, neck, and/or shoulders, are positioned, translocated, dislocated, contorted, swollen, and/or otherwise volumetrically and/or geometrically altered from their "resting" locations, shapes, and/or volumes by means of the contraction of one or more related muscles and/or muscle groups.

Figure 2:
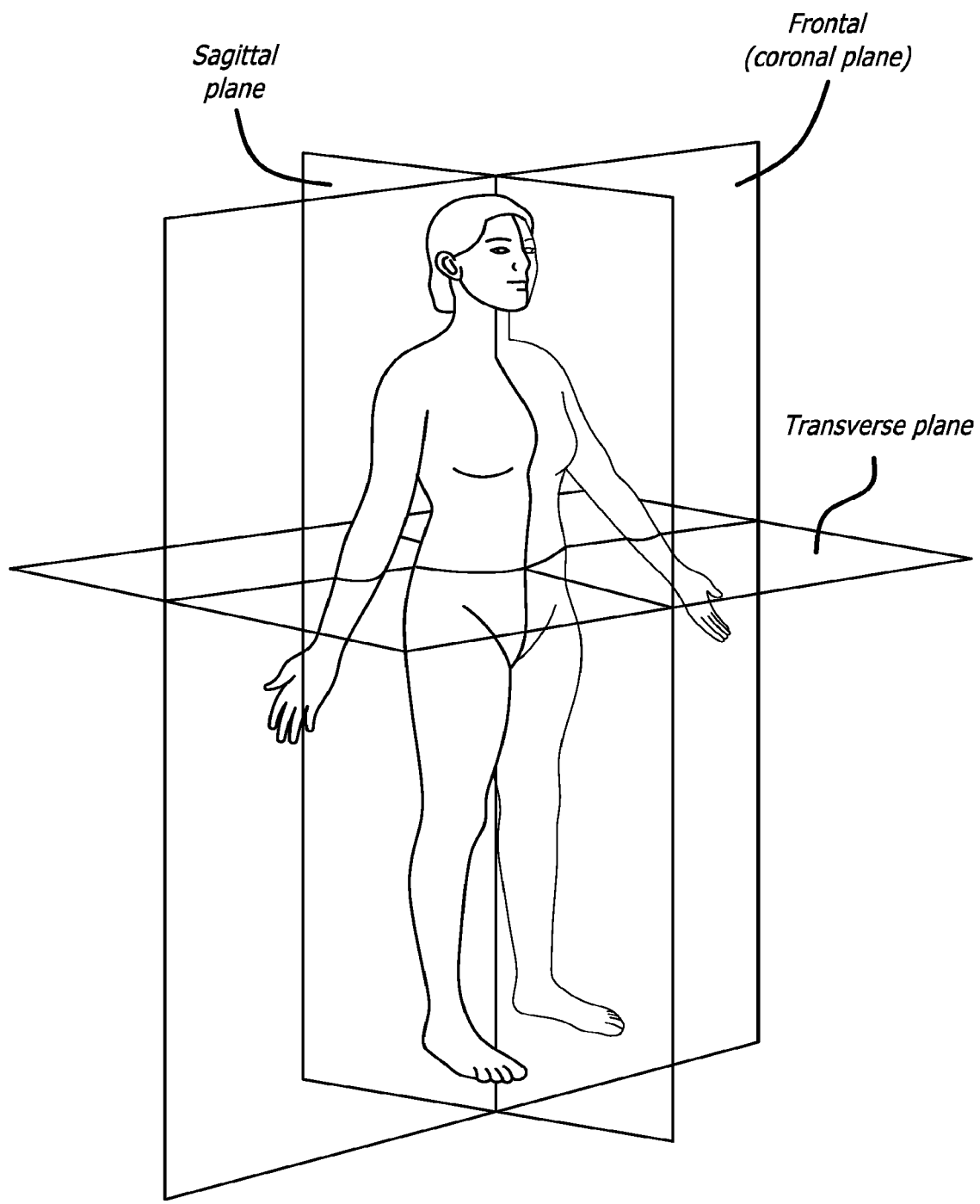
FIG. 2 is an illustration of the Sagittal, Frontal and Transverse planes, which are used to define and discuss the relative locations of muscles and other features of the human body, as well as the orientation of translocations of those features.

It should also be understood that each such reference to the degree of a muscular contraction, unless clearly specified to the contrary, should be considered equally applicable in whole, or in part, to the detection and conversion of the degrees to which one or more related features are altered with respect to their relative alignment with respect to the orientations and/or axes of alignment, of other parts of the body (e.g. the degree to which the Sagittal plane of the head is rotated out of normal with respect to the Transverse plane of the shoulders—see FIG. 2).

It should also be understood that each such reference, unless clearly specified to the contrary, should be considered equally applicable in whole, or in part, to the detection and conversion of the degrees to which the nerves innervating target muscles and/or muscle groups are activated. The detection of the degrees to which specific nerves are innervated might be accomplished through measurements involving, but not limited to: a) electrical properties (e.g. voltages, currents, capacitances, etc.); b) magnetic properties.

It should also be understood that each such reference, unless clearly specified to the contrary, should be considered equally applicable in whole, or in part, to the detection and conversion of alternate types of changes indicative of muscular contractions, including, but not limited to: the degrees of strain on the skin on the face, head, neck, and/or shoulders of a user (measured by strain gauges); and, optical properties (e.g. degrees of redness, degrees of shading, 3D models constructed from stereoscopic images and/or shading, etc.).

21. Measurable Features of the Head, Neck and Upper Torso a. Measurable Facial Features Expressive facial features are often the result of two or more muscles working together. For this reason, the control of relatively large facial features will likely be easier for people to master and execute, than would be the control of the individual muscles giving rise to the movements of those features.

The facial features that can be consciously controlled by a person, and will be readily discernable by an automated detection and measurement system (e.g. such as might be based on the analysis of images streaming from a video camera), and might therefore be useful for the user-controlled generation (i.e. through voluntary and deliberate facial expressions) of input to a computer, include, but are not limited to:

shape of lips (e.g. pursed or relaxed)
shape of rictus (i.e. shape of the orifice of the mouth)
relative proportion of mouth that is "open"
relative exposure of upper teeth and/or lower teeth
relative longitudinal extension of jaw and/or chin
relative lateral extension of jaw and/or chin
tongue position (e.g. exposed or not)
angular orientation of mouth relative to longitudinal axis of face
relative eyelid position (e.g. open or closed)
relative proportion of eye(s) that is "open"
relative orientation of "gaze" (relative to user, NOT to computer)
relative flare of nostrils relative position(s) of eyebrow(s) (e.g. raised, relaxed, or lowered)

relative depth of furrows on forehead emotional facial expression (happiness, surprise, fear, anger, sadness)

b. Measurable Head-and-Neck Features

Relative Orientation and/or Position of the Head

If both the face and neck of a user are available for monitoring and evaluation (e.g. are visible to a computer's camera) then the relative orientation of the head, with respect to the frontal, sagittal and transverse planes of the body (as established by the user's neck and/or shoulders) can be used to generate additional bits of information.

Absolute Orientation and/or Position of the Head

Furthermore, by comparing the position of the head of a user to vertical and/or horizontal edges visible behind the user (e.g. doorways, walls, and/or windows), it is possible to use the absolute orientation of the user's head (e.g. relative to a gravitationally-defined vertical) to generate even more bits of information. The absolute orientation of the user's head with respect to "true vertical" could also be accomplished using the "gravity" sensor, magnetometer, and/or accelerometers of a smartphone or other computing device that is measuring (e.g. by video) the user's features.

Relative and absolute head positions can be consciously controlled by a person, and can be readily discerned by an automated system, and can therefore be used to enable a user to directly control the computer processor of the device disclosed herein. These relative and absolute head positions include, but are not limited to:

left or right tilt of head (i.e. in frontal plane of body)

forward or backward tilt of head (i.e. in sagittal plane of body)

vertical axis of head relative to vertical axis of body (i.e. in transverse plane of body)

rotation of head relative to torso (i.e. looking left of right)

c. Measurable Features of the Upper Torso

The raising of the left and/or right shoulders, even slightly, can be readily discerned by an automated system, and can therefore be used to enable a user to directly control the computer processor of the device disclosed herein. Other features of the upper torso can also be used as signals for the device disclosed herein (e.g. thrusting out the chest).

d. Measurable Angular Scale

By adjusting the distance of the user's head from the camera detecting the values of the measurable facial features and head orientations, the absolute size of the user's head (e.g. in pixels) in the captured images, and/or video stream, will change. The size of the user's head, e.g. relative to a baseline size, can be used by a user to specify additional bits of information for the invention disclosed herein. For instance, if the user were using a small hand-held version of this invention, and if that device were using a "selfie" camera to detect and measure the user-generated feature movements, then the user could move the smartphone closer to, and further from, his body in order to change the "signal" associated with his head's absolute pixel size in the measurement images.

e. Measurable Facial Muscles

While it might require more practice on the part of a person in order to achieve conscious mastery of their control, and while it might require more a sophisticated detection system to determine their state and to measure their "values," the monitoring of a user's controlled contractions of individual facial muscles will nonetheless provide allow users to generate high-resolution input values (i.e. values of many bits), and to thereby exert highly-resolved control of the processor(s) of the invention disclosed herein.

The facial muscles that might be consciously controlled by a person, and could be readily discerned by an automated "signal" detection and measurement system, and would therefore enable a user to exert direct control of a computer through voluntary facial expressions, include, but are not limited to:

i. Those controlled by the third ("IIi") cranial nerve (i.e. the "Oculomotor Nerve"), including, but not limited to:

the "Levator Palpebrae Superioris" muscle;

the "Superior Tarsal" muscle;

ii. Those controlled by the fifth ("V") cranial nerve (i.e. the "Trigeminal Nerve"), including, but not limited to:

A. Those controlled by the "Mandibular" nerve (i.e. the "V3" nerve), including, but not limited to:

the "Masseter" muscle (i.e. one of the muscles of mastication);

the "Temporalis" muscle (i.e. one of the muscles of mastication);

the "Medial Pterygoid" muscle (i.e. one of the muscles of mastication);

the "Lateral Pterygoid" muscle (i.e. one of the muscles of mastication);

the "Tensor Tympani" muscle;

the "Tensor Veli Palatine" muscle;

the "Mylohyoid" muscle;

the "Anterior Belly of Digastric" muscle;

B. Those controlled by the seventh ("VII") cranial nerve (i.e. the "Facial Nerve"), including, but not limited to:

1. Those controlled by the "Posterior Auricular" nerve, including, but not limited to: the "Occipitofrontalis" muscle (i.e. the "Occipital Belly"); the "Posterior Auricular" muscle;

2. Those controlled by the "Temporal" nerve, including, but not limited to: the "Occipitofrontalis" muscle (i.e. the "frontal belly");

the "Orbicularis Oculi" muscle (i.e. the orbital and palpebral portions);

the "Corrugator Supercilii" muscle;

the "Procerus" muscle;

the "Anterior Auricular" muscle;

the "Superior Auricular" muscle;

the "Termporoparietalis" muscle;

3. Those controlled by the "Zygomatic" nerve, including, but not limited to:

the "Oribicularis Oculi" muscle (i.e. the lacrimal portion);

the "Levator Labii Superioris" muscle;

the "Zygomaticus Major" muscle;

4. Those controlled by the "Buccal" nerve, including, but not limited to:

the "Nasalis" muscle;

the "Levator Anguli Oris" muscle;

the "Zygomaticus Major" muscle;

the "Zygomaticus Minor" muscle;

the "Orbicularis Oris" muscle;

the "Risorius" muscle;

the "Buccinator" muscle;

the "Depressor Septinasi" muscle;

the "Levator Labii Superioris Alaeque Nasi" muscle;

5. Those controlled by the "Mandibular" nerve, including, but not limited to:

the "Depressor Labii Inferioris" muscle;

the "Mentalis" muscle;

the "Depressor Anguli Oris" muscle;

the "Transversus Menti" muscle;

6. Those controlled by the "Cervical" nerve, including, but not limited to: the "Platysma" muscle;
C. Those controlled by the twelfth ("XII") cranial nerve (i.e. the "Hypoglossal Nerve"), including, but not limited to:
the "Genioglossus" muscle;
the "Hyoglossus" muscle;
the "Styloglossus" muscle;
the "Geniohyoid" muscle;
the "Thyrohyoid" muscle;
f. Measurable Head, Neck and Upper-Torso Muscles
The head, neck and/or upper-torso muscles that might be consciously controlled by a person, and might be readily discernable by an automated video system, and might therefore be useful for the direct control of a computer by a user through voluntary tilts of the person's head, include, but are not limited to:
i. Those controlled by the eleventh ("XI") cranial nerve (i.e. the "Accessory Nerve"), including, but not limited to:
the "Trapezius" muscle;
the "Sternocleidomastoid" muscle;
ii. Those controlled by the "Long Thoracic Nerve" including, but not limited to: the "Serratus Anterior Superior" muscle;
the "Serratus Anterior Intermediate" muscle;
the "Serratus Anterior Inferior" muscle;
iii. Those controlled by the "Dorsal Scapular Nerve" including, but not limited to:
the "Rhomboid Major" muscle;
the "Rhomboid Minor" muscle;
iv. Those controlled by the "Ventral Ramus of the C5 and C6 cervical nerves" including, but not limited to:
the "Scalenus Anterior" muscle;
v. Those controlled by the "Ventral Rami of the C3-C8 cervical nerves" including, but not limited to:
the "Scalenus Medius" muscle;
vi. Those controlled by the "C6-C8 cervical nerves" including, but not limited to:
the "Scalenus Posterior" muscle;
vii. Those controlled by the "Thoracodorsal Nerve" including, but not limited to:
the "Latissimus Dorsi" muscle;
viii. Those controlled by the "Axillary Nerve" including, but not limited to:
the "Deltoid" muscle;
the "Teres Minor" muscle;
ix. Those controlled by the "Greater Occipital Nerve" including, but not limited to:
the "Semispinalis Capitis" muscle;
x. Those controlled by the "Posterior Ramus of spinal nerves C3 and C4" including, but not limited to:
the "Splenius Capitis" muscle;
xi. Those controlled by the "Suboccipital Nerve" (i.e. the Dorsal Ramus of C1), including, but not limited to:
the "Rectus Capitis Posterior Major" muscle;
g. Detection and Measurement Methodologies
Movements, contractions and/or other changes in each of the above features and/or muscles can be detected and measured in a number of ways, which include, but are not limited to, the following:
i. Video Monitoring
The movements and/or contractions in features and/or muscles used as signals for this invention can be detected and measured visually (e.g. with a camera).
A computing device is equipped with one or more video cameras, and/or other means of capturing images, and is thereby made capable of capturing images of the face, head, neck and upper torso of the device's user and/or other person(s) while they interact with the computer.

When appropriate, the resulting stream(s) or series of images captured by said camera(s) are analyzed with respect to one or more aspects of the shape, orientation, distortion and/or appearance of the relevant features.

The instantaneous configuration of the imaged features are measured and/or calculated. The change(s) in the imaged features over time are also measured and/or calculated.

The resulting instantaneous feature configurations are checked to determine if they map to one or more types and/or values of defined and/or enabled inputs to the computing device, e.g. computer commands and data, application commands and data, etc.

ii. Electrical Monitoring

The movements and/or contractions in features and/or muscles used as signals for this invention can be detected and measured electrically. Contractions of the muscles involved can, in some cases at least, be detected by changes in voltage and/or capacitance on the skin overlaying the affected area(s).

A computing device is equipped with one or more electrical voltage, current and/or capacitance sensors, and/or other means of detecting the electrical qualities/characteristics of one or more "feature" muscles and/or the overlying skin. The computing device is thereby made capable of detecting and monitoring the electrical states and/or changes associated with the innervation and/or changes in innervation of muscles in the face, head, neck and/or upper torso of the device's user and/or other person(s) while they interact with the computer.

The resulting stream of instantaneous muscle-associated electrical properties of a user of the computing device, are checked and monitored over time in order to determine if they map to one or more types and/or values of defined and/or enabled inputs to the computing device, e.g. computer commands and data, application commands and data, etc.

iii. Magnetic Monitoring

The movements and/or contractions in features and/or muscles used as signals for this invention can be detected and measured magnetically. As indicated above, the movements and/or contractions can be detected and measured electrically, and electrical currents, such as those manifested in the nerves innervating the affected muscles generate magnetic fields which can be detected.

iv. Spectrographic Monitoring

The movements and/or contractions in features and/or muscles used as signals for this invention can be detected and measured spectrographically due to their effect on blood flow in the area(s) affected by the relevant muscle contractions.

When muscles contract, their localized expansion increases the pressure applied to the skin overlaying the muscle. Those contraction-induced pressure increases impede the flow of blood through the skin in the affected area(s). Such changes in the volume of blood flow through the skin can be measured spectrographically (i.e. through the analysis of the spectra of colors detected in images (or even with individual "single-pixel" photo detectors) of a user's skin.

When a muscle contracts, it can create a localized "swelling." That swelling can squeeze out (i.e. resist the inflow of, and accelerate the outflow of) the blood in that muscle, as well as in the tissues, especially in the skin, that are adjacent to it. This change in the localized volume and/or rate of blood flow in an area of the relevant muscle and/or feature can be detected through spectral analysis of images of that area of the user's skin. Such monitoring could be accomplished with a standard video camera, as well as by other methods, and through the use of other sensor technologies.

For example, "pulse oximeter" are sensors that are able monitor the changes in blood flow associated with the beating of a person's heart (in order to monitor the heart rate of that person). These same kinds of sensors, or a similar technology, could also be used to monitor the rate and/or volume of blood flow through each part of a user's face, head, neck and/or upper torso, thus permitting a computing device to indirectly monitor the degree of contraction in at least one of the muscles of the user.

Oxygenated blood absorbs light at 660 nm (red light), whereas deoxygenated blood absorbs light preferentially at 940 nm (infra-red). Pulse oximeters consist of two light emitting diodes, at 600 nm and 940 nm, and two light collecting sensors, which measure the amount of red and infra-red light emerging from tissues traversed by the light rays. The relative absorption of light by oxyhemoglobin (HbO) and deoxyhemoglobin is processed by the device and an oxygen saturation level is reported. The device directs its attention at pulsatile arterial blood and ignores local noise from the tissues. The result is a continuous qualitative measurement of the patients oxyhemoglobin status. Oximeters deliver data about pulse rate, oxygen saturation ($SpO_2$) and even cardiac output.

http://www.ccmtutorials.com/rs/oxygen/page17.htm

Through the use of one or more blood-flow and/or rate-of-blood-flow sensors, a computing device is thereby made capable of detecting and monitoring the degree to which muscles in the face, head, neck and/or upper torso of the device's user and/or other person(s) are contracted, and/or have changed their degree of contraction, while they interact with the computer.

The resulting stream of instantaneous facial blood-flow properties of a user of the computing device, are checked and monitored over time in order to determine if they map to one or more types and/or values of defined and/or enabled inputs to the computing device, e.g. computer commands and data, application commands and data, etc.

v. Thermal Monitoring

The movements and/or contractions in features and/or muscles used as signals for this invention be detected and measured through the capture and analysis of infra-red images of a user's skin.

As mentioned above, muscle contractions will reduce the volume of blood flowing through those areas of skin overlaying the contracted muscles. And, it should be possible to detect changes (e.g. reductions) in the temperature of the skin overlaying contracted muscles, and the magnitudes of those temperature changes should be correlated with the magnitudes of the muscle contractions.

vi. Audio Monitoring

The movements and/or contractions in features and/or muscles used as signals for this invention can be detected and measured through the changes that will occur in the volume of "pulse" related sounds arising from the pumping of blood through the skin overlaying the relevant muscles.

As mentioned above, muscle contractions will reduce the volume of blood flowing through those areas of skin overlaying the contracted muscles. Reductions in blood flow will change the volume and character of the sound of the pulsating blood flow.

vii. Torsional/Spatial Monitoring

There are many technologies currently available for directly measuring stretching and bending, with some specifically designed to measure the stretching and bending along the surface of a human. It is also possible to analyze shading, and/or changes in shading, on a person's face, head, neck and/or upper torso in order to measure and monitor changes in the contour(s) of that person's face, head, neck and/or upper torso. Furthermore, with the use of two or more video cameras, it is possible to construct, and monitor changes in, 3D models of a person's face, head, neck and/or upper torso, thus allowing for the detection and/or monitoring of the relative degrees of contraction in the relevant muscles.

These, and/or other technologies and/or methods, could be used to monitor the shape of a user's face, head, neck and/or upper torso, and thereby to determine and/or monitor changes in that shape and the relative degree of contraction of the muscles underlying it.

The resulting stream of instantaneous facial muscle contraction readings of a user of the computing device, are checked and monitored over time in order to determine if they map to one or more types and/or values of defined and/or enabled inputs to the computing device, e.g. computer commands and data, application commands and data, etc.

22. Exemplary Feature Sets a. An exemplary embodiment of the present disclosure responds to variations in the locations of FOUR features of a user's face, head, neck, and shoulders, i.e. the degree of lifting or furling of the eyebrows; the degree of tilting, within the coronal plane, of the head; the degree of partial closing of the left and right eyes; and the degree of tilting, within the sagittal plane, of the head.

i. It detects the average roughly vertical distances of the eyebrows relative to the inside corners (i.e. the canthi) of the respective eyes. Those vertical eyebrow states are quantized into five relative numbers: 0 represents fully furled eyebrows (shortest distance between centers of eyebrows and respective canthi); 1 represents partially furled eyebrows; 2 represents relaxed and/or neutrally-positioned eyebrows; 3 represents partially lifted eyebrows; and, 4 represents fully lifted eyebrows.

ii. It detects the angular tilt of the head in a "side-to-side" direction (i.e. within the coronal plane) relative to the transverse plane through the shoulders. Those degrees of relative tilt are quantized into seven relative numbers: 0 represents a head tilted by about 15 degrees to the user's left; 1 represents a head tilted by about 10 degrees to the user's left; 2 represents a head tilted by about 5 degrees to the user's left; 3 represents a vertical (non-tilted) head; 4 represents a head tilted by about 5 degrees to the user's right; 5 represents a head tilted by about 10 degrees to the user's right; and, 6 represents a head tilted by about 15 degrees to the user's right.

iii. It detects the degree to which the left and right eyelids are closed relative to the greatest separation of each eye's upper and lower eyelids along an axis within a plane parallel to the head's sagittal plane. Those relative degrees of separations are quantized into four numbers: 0 represents both eyes are fully open; 1 represents that the user's right eye is partially closed (squinting) while the user's left eye is fully open; 2 represents that the user's left eye is partially closed while the user's right eye is fully open; and, 4 represents that both eyes are partially closed.

iv. It detects the angular tilt of the head in a "front-to-back" direction (i.e. within the sagittal plane) relative to the coronal plane as measured by the separation of the user's chin from his chest. Those degrees of relative tilt are quantized into seven relative numbers: 0 represents a head tilted backward by about 15 degrees; 1 represents a head tilted backward by about 10 degrees; 2 represents a head tilted backward by about 5 degrees; 3 represents a vertical (non-tilted) head; 4 represents a head tilted forward by about 5 degrees; 5 represents a head tilted forward by about 10 degrees; and, 6 represents a head tilted forward by about 15 degrees.

The user-executed translocations of these four features, relative to their respective landmarks on the user's body, will provide: 4 states for the available eyebrow positions; 7 states for the available coronal tilts of the head; 4 states for the available degrees and combinations of squinting; and, 7 states for the available sagittal tilts of the head. Thus, the permutations of these feature-specific states will provide the basis for 784 composite states, and therefore for 784 embodiment-specific and/or application-specific values.

This feature set, and its provision to a user of up to 784 embodiment-specific and/or application-specific values, has the advantage of providing the user with sufficient values to specify S ASCII control characters (e.g. carriage return, delete, etc.), 27 non-alphanumeric characters (e.g. "!", "?", etc.), 10 numeric digits (e.g. "0" through "9"), 26 capitalized letters ("A" through "Z"), and 26 lower-case letters (e.g. "a" through "z")—a total of 94 ASCII characters. It leaves an additional 690 values that can be assigned to various colors, application-specific operations (e.g. "create new file", "save file", etc.), and/or specific frequently-used words, phrases, openings (e.g. "Dear Sir:"), closings (e.g. "Best Regards, John Smith"), etc.

b. Another exemplary embodiment of the present disclosure responds to variations in the locations of TWO features of a user's head, i.e. the degree of tilting, within the coronal plane, of the head; and the degree of tilting, within the sagittal plane, of the head.

As explained relative to the first set of preferred features described above, the user-executed translocations of these two features, relative to their respective landmarks on the user's body, will provide: 7 states for the available coronal tilts of the head; and, 7 states for the available sagittal tilts of the head. Thus, the permutations of these feature-specific states will provide the basis for 49 composite states, and therefore for 49 embodiment-specific and/or application-specific values.

This feature set, and its provision to a user of up to 49 embodiment-specific and/or application-specific values, has the advantage of providing the user with sufficient values to control a relatively large variety of parameters through value-specific parameter designations and at least ten numeric digits. It has the additional advantage of being relatively "light-weight" allowing the values, and the facial-, and/or bodily-, contortions required for their generation, to be learned relatively quickly.

23. Exemplary Muscles a. An exemplary embodiment of the present disclosure uses sensors responsive to varying voltages to detect and measure the degrees to which specific muscles are contracted. This exemplary embodiment is identical to the embodiment described in the first preferred feature set above (i.e. the one that is responsive to changes in the relative positions of the eyebrows and eyelids, and changes in the relative coronal and sagittal tilts of the head) with one exception. This exemplary embodiment detects, measures, and quantizes, the degrees to which the muscles, responsible for the translocation of the respective features in the feature-specific embodiment, are activated through the detection of the differential voltages associated with those contractions.

i. This exemplary embodiment measures and quantizes the movements of the eyebrows through the measurement and quantization of the voltages associated with the muscles responsible for the raising and furling of the eyebrows, which includes the muscles that elevate the eyebrows: the occipitofrontalis (frontal belly) muscle, and the temporoparietalis muscles; as well as the muscles that furl the eyebrows: corrugator supercilii muscles, and the procerus muscles.

ii. This exemplary embodiment measures and quantizes the left-and-right tilts of the head through the measurement and quantization of the voltages associated with the muscles responsible for positioning the head at such a tilt, which includes: the scalene muscles, the trapezius muscles, and the sternocleidomastoid muscles.

iii. This exemplary embodiment measures and quantizes the degree of squinting of the left and right eyelids through the measurement and quantization of the voltages associated with two sets of muscles: 1) the muscle responsible for the elevation of the upper eyelids, i.e. the levator palpebrae superioris muscles; and, 2) the muscle responsible for the closing of the eyes, i.e. the orbicularis oculi muscles.

iv. This exemplary embodiment measures and quantizes the front-and-back tilts of the head through the measurement and quantization of the voltages associated with the muscles responsible for positioning the head at such a tilt, which includes: the sternocleidomastoid muscles, the Semispinalis capitis muscles, the Semispinalis cervicis muscles, the Semispinalis thoracis muscles, the Splenius capitis muscles, the Splenius cervicus muscles, the Spinalis capitis muscles, and the Longissimus capitis muscles.

24. Exemplary Nerves a. An exemplary embodiment of the present disclosure uses sensors responsive to varying voltages to detect and measure the degrees to which specific nerves, and/or their corresponding muscles, are innervated. This embodiment is identical to the embodiment described in the first preferred feature set above (i.e. the one that is responsive to changes in the relative positions of the eyebrows and eyelids, and changes in the relative coronal and sagittal tilts of the head) with one exception. This exemplary embodiment detects, measures, and quantizes, the degrees to which the nerves and muscles, responsible for the translocation of the respective features in the feature-specific embodiment, are innervated through the detection of the differential voltages associated with those innervations.

i. This exemplary embodiment measures and quantizes the movements of the eyebrows through the measurement and quantization of the voltages associated with the temporal branch of the Facial nerve (Cranial nerve VII) that innervates the muscles that lift the eyebrows; as well as the voltages associated with the Buccal branch of the Facial nerve that innervates the muscles that furl the eyebrows.

ii. This exemplary embodiment measures and quantizes the left-and-right tilts of the head through the measurement and quantization of the voltages associated with the portions of Cervical nerves 5 through 8, and the accessory nerve (Cranial nerve XI), which are responsible for the innervations of the muscles that tilt the head side-to-side.

iii. This exemplary embodiment measures and quantizes the degree of squinting of the left and right eyelids through the measurement and quantization of the voltages associated with two sets of nerves: 1) those responsible for the innervations of the muscles that change the positions of the upper eyelids, i.e. the infratrochlear, supratrochlear, supraorbital, and lacrimal nerves (from the ophthalmic branch, V1, of the trigeminal nerve, CN V); and, 2) those responsible for the innervations of the muscles that change the positions of the lower eyelids, i.e. the infratrochlear nerves, and branches of the infraorbital nerves (of the maxillary branch, V2, of the trigeminal nerve).

iv. This exemplary embodiment measures and quantizes the front-and-back tilts of the head through the measurement and quantization of the voltages associated with the portions of the accessory nerve (Cranial nerve XI), the greater occipital nerve, the dorsal primary rami of the cranial and thoracic nerves C3 to T6, and the posterior rami of the cranial nerves C3 to C8, which are responsible for the innervations of the muscles that tilt the head front-and-back.

25. Commercialization

Embodiments of the present disclosure can be integrated with a great variety of functionalities, and/or into a great variety of device types, known in the prior art, such as personal computers, smart phones, ATMs, POS terminals, music synthesizers, self-driving cars, gaming consoles, smart televisions, etc. The conversions of these known devices to the novel system disclosed herein would involve the addition of one or more sensors (e.g. camera(s)) that would monitor the face, head, neck, and/or shoulders, of a user, and/or the muscles therein.

Some existing computerized devices could be transformed into embodiments of the present disclosure through the addition, to each such device, of at least one sensor, e.g. a camera, and through the downloading from the internet of at least one set of computer codes, able to operate within the device, and, when operational, to detect and measure, directly (e.g. through the analysis of image data generated by a camera) or indirectly (e.g. through the analysis of voltage data generated by sensors in contact with a user's skin), specific geometrical changes to the user's face, head, neck, and/or shoulders. The set of computer codes would also be capable of transforming specific geometrical configurations of the user's face, head, neck, and/or shoulder, into digital values appropriate the user's use and/or control of the device.

26. User Customization of Codes

An exemplary embodiment of the present disclosure allows a user to specify which features of the face, head, neck, and/or shoulders, will be used by the user to communicate and/or specify values to the embodiment. Another exemplary embodiment of the present disclosure allows a user to specify which muscles of the face, head, neck, and/or shoulders, will be used by the user to communicate and/or specify values to the embodiment. Another exemplary embodiment of the present disclosure allows a user to specify which nerves of the face, head, neck, and/or shoulders, will be used by the user to communicate and/or specify values to the embodiment.

27. Embodiment-Specific Codes

An exemplary embodiment of the present disclosure will communicate to a user which features of the user's face, head, neck, and/or shoulders, (i.e. which "component codes") are available to the user to communicate and/or specify values to the embodiment. Another exemplary embodiment of the present disclosure will communicate to a user which muscles of the user's face, head, neck, and/or shoulders, are available to the user to communicate and/or specify values to the embodiment. Another exemplary embodiment of the present disclosure will communicate to a user which nerves of the user's face, head, neck, and/or shoulders, are available to the user to communicate and/or specify values to the embodiment.

An exemplary embodiment of the present disclosure communicates which features, muscles, and/or nerves, are available to a user to communicate and/or specify values to the embodiment by means of one or more graphic illustrations displayed to the user on a display device of the embodiment.

Another exemplary embodiment of the present disclosure communicates which features, muscles, and/or nerves, are available to a user to communicate and/or specify values to the embodiment by prompting the user to submit feature-, muscle-, and/or nerve-encoded values to the embodiment. The embodiment responds to each user submission by generating a signal, e.g. with a light, a beep, or some other binary indicator of validity versus invalidity, indicating whether or not the user-supplied composite code was composed of all required component codes. A user could then discover a set of component codes that satisfied the embodiment, and could then eliminate individual component codes to test whether or not each eliminated component code were in fact required for communication with the embodiment.

Another exemplary embodiment of the present disclosure might indicate through an "input type" code (e.g. an industry standard code) which standard set of component codes were used by the embodiment. Such an input type code might contain multiple elements, or sub-codes. One sub-code might indicate the set of features, muscles and/or nerves that the embodiment monitored, detected changes in, and translated into component quantized numbers. Another sub-code might indicate the "range" of quantized values associated with all of the related features, muscles and/or nerves, or alternately with each feature, muscle and/or nerve.

Another exemplary embodiment of the present disclosure might allow a user to input a code, value, data file, etc., that will specify the user's preferred communication features, muscles, and/or nerves, as well the user's preferred "range" of quantized values to be derived from each. Such an embodiment might map its internal composite values to the user-specified features, muscles, and/or nerves, with respect to the user-specified quantization ranges.

It will be obvious to those skilled in the art, that there are many methods, techniques, protocols, etc., by which an embodiment might communicate to a user which features, muscles and/or nerves are required for communication and/or control of the embodiment.

28. Detection of Diseases

By saving, over time (e.g. months, years, decades), statistics related to a user's generation of contraction-encoded values with one or more embodiments of the present disclosure, it is possible to detect changes (especially reductions) in that user's pace and/or frequency of submitting codes to the one or more embodiments. It is also possible to detect changes (especially increases) in the frequency with which that user submits erroneous codes which he must subsequently correct, and/or the frequency with which he repeats valid codes (especially when such redundancies are otherwise ignored by the one or more embodiments and are therefore not the same as overt errors which require correction).

Any of the above changes, especially reductions, in user efficiency and/or accuracy might be indicative of the onset of disease, especially of a neurological character. Some of the diseases that exemplary embodiments are capable of detecting include, but are not limited to: amyotrophic lateral sclerosis (ALS), Bell's palsy, brain tumors, cerebral atrophy (especially age-related forms), Creutzfeldt-Jakob disease (CJD), dementia, diabetic neuropathies (associated with potentially undiagnosed diabetes mellitus), Huntington's disease, Parkinson's disease (PD), sleep apnea, and stroke.

A number of embodiments of the present disclosure log metrics related to a user's efficiency and accuracy and alert the user and/or one or more third parties (e.g. a parent, account holder, medical professional, etc.) of a potential health issue with the user, as well as any preliminary data with diagnostic relevance.

29. Exemplary Embodiments

Embodiments may differ at least with respect to how many altered geometrical configurations of the face, head, neck, and/or shoulders they support. Some will support only a few geometries. Others will support a large number of geometries.

Embodiments may differ at least with respect to how many variations of any particular geometrical alteration they discriminate. This is really a difference with respect to how many quantized measures are produced with respect to any particular geometrical alteration. For example, one embodiment will only discrimination between three subranges of alterations related to the raising or furling of the eyebrows (e.g. fully-raised, neutral, fully-furled). Another will discriminate between five subranges of those alterations (e.g. fully-raised, partially-raised, neutral, partially-furled, fully-furled).

Embodiments may differ at least with respect to how the alterations in geometry are detected, e.g. camera, voltage sensor, accelerometer, etc., and, relatedly, with respect to which physical attribute of an altered geometry they measure (e.g. flat visual (2D), volumetric (3D), electrical, etc.).

Embodiments may differ at least with respect to how they communicate the supported geometries to a user.

Embodiments may differ at least with respect to whether or not they allow a user to specify the geometries, and/or their ranges, that will be used to specify each available symbolic value supported by the embodiment.

Embodiments may differ at least with respect to whether or not they allow an application developer to specify the geometries, and/or their ranges, that will be used to specify each available symbolic value supported by the embodiment.

Embodiments may differ at least with respect to how well they can correctly interpret (i.e. "correct") poorly-formed or poorly-executed geometries.

Embodiments may differ at least with respect to the maximum rate of geometrically-encoded signals they are able to support (i.e. "how fast a user can submit signals").

Embodiments may differ at least with respect to how the geometrically-encoded signals that they communicate to the embodiment are processed (i.e. "what they are used for").

a. Smartphone

The use of smartphones as general computing platforms is increasing. And small, hand-held computing devices, such as smartphones and tablet computers, are typically operated without the benefit of a physical keyboard. These devices are thus typically operated and controlled without a high-resolution means of manual control. Instead, these devices typically rely on "virtual" keyboards, which are illustrated on the screens of these devices like any other graphic, and then require a user to touch that portion of the screen overlying the desired character or characters.

Many people have experienced the distraction and frustration that can result from sitting or standing too near a person using a smartphone.

That person might be talking (too loudly), and the content of their oratory might be less than interesting, and there is little or no hope of blocking the intrusion of that stream of verbiage into one's ears and mind. That person might be feverishly touching the screen of their device, composing text messages of one sort or another (e.g. traditional text messages, twitter posts, Facebook or Google chats, etc.). And the visual distraction, even if isolated to one's peripheral vision, is also hard to ignore.

There is a need for a method and/or technology that will allow a person to interact with their friends and/or colleagues via a smartphone, or other computer-mediated communications device, without the noise produced by spoken words, nor the visual distraction produced by incessant tapping and sliding on a screen.

b. Security Challenge

Because of its combination of allowing a user to submit a password "code", while also allowing a system to monitor the unique attributes of each code-specific geometry evidenced by a user (e.g. the detailed imagery visible on the surface of the user's face, such as scars, veins, warts, etc., that is visible at the time the user executes each particular password-related symbolic value; user-characteristic tremors that are observable during the user's execution of the password-specific geometries; user-unique characteristics related to the electrical properties manifested during the user's execution of the code-related muscular contractions; etc.).

The additional user-unique information that can be garnered by a system during its monitoring of a user's execution of his geometrically-encoded password codes can provide a highly proprietary, if not unique, fingerprint of that user which would be difficult for a thief to simulate.

c. Deep Code Set

Through the use of a large number of component geometries, and the discrimination of a greater number of intermediate geometries between the defining extremes (i.e. a greater range of symbolic values per component geometry), a large set of symbolic values can be made available to a user. While a greater set of values will require more time for a user to master, the benefit can exceed that cost for a number of users, e.g. for quadriplegics who might elect to use an embodiment of the present disclosure as their primary means of communication.

30. Potential Benefits

The inventions disclosed herein may provide many benefits unavailable to people with respect to the current state of the art. These benefits include, but are not limited to, the following:

a. Silent Hands-Free Input

The inventions disclosed herein may allow a user to control his computer, and even to compose text, documents, music, etc., without using his hands or fingers, and without speaking verbal commands and information. This is particularly convenient when a user is holding the computer in one hand and attempting to use it in a crowded and/or public area where protecting the security of the data input to the computer could be a concern.

The inventions also may allow a user to control and/or interact with his computer in a public settings without risking the ire of nearby people who might be frustrated and/or angered by chronic rapid hand motions and/or be audible vocalized commands and data.

b. Silent and Private "Mouthed" Conversations

The inventions disclosed herein may allow a user to have private conversations in public places. By formulating messages through the deliberate and coordinated contractions of facial muscles, a user need not articulate anything that might be accidentally or deliberately overheard by someone nearby. In fact, two users of this invention might each generate their message for the other through the coordinated contraction of specific facial muscles, while listening to the synthesized translations of the messages received from the other through headphones.

Such conversations would not require the frustration and health risks associated with the repeated high-frequency selection of characters through small manual or virtual keyboards—while enjoying equal, if not superior, resolution in the complement of facially-encoded commands and/or symbols available to them to increase the "richness" of their communications.

c. Detection of Damage to Various Nerves

The muscles in the face that give rise to facial expressions are innervated by a pair of facial nerves (i.e. cranial nerves V and VII), one of each for the right side of the face, and another of each for the left. The muscles of the tongue are innervated by the Hypoglossal Nerve. And, other muscles that can serve as signals for embodiments of this invention are innervated by other nerves.

By logging, over time, the types and extent of contractions, movements and/or other changes detected in the signal muscles of a particular user, and especially with respect to laterally complementary signal muscles (i.e. one on each side of the user's body), a signal-muscle-controlled computer could alert a user that a reduction in the vigor of the contractions and/or movements innervated by one or more nerves has been detected. Such a reduction, especially if it is characteristic of only one side of a user's body, could be indicative of damage and/or disease in the respective nerve(s).

d. Detection of Depression and Other Psychological Disorders

By logging, over time, the types and extent of facial expressions and/or body movements detected in a particular user, a signal-muscle-controlled computer could alert a user that the relative frequency of movements and/or expressions characteristic of various psychological maladies, e.g. of depression, are increasing. As well as helping to detect an increasing relative frequency of movements and/or facial expressions consistent with psychological illnesses, a signal-muscle-controlled computer might also detect a reduction in the magnitude and/or duration of movements and/or facial expressions antithetical to various psychological problems. For example, an ever decreasing relative frequency of the generation and/or duration of smiles, and other facial expressions consistent with happiness, might indicate the onset of depression.

e. Monitoring of Various Health-Related Characteristics

Because a signal-muscle-controlled computer will detect, analyze, categorize and quantify a user's body language and facial expressions, and because an embodiment could also log the relative frequencies, magnitudes and/or other parameters associated with those expressions, over time, it will be possible for that computer, or those logs, to be used to provide feedback on the "quality" of the body language and facial expressions detected by the computer. If a user's body language and/or facial expressions deviate from what is "common" or "normal" (perhaps as defined by a compilation of user-specific expression data aggregated over time) then feedback about such "abnormalities" might be provided to the user and/or to a therapist.

In this way, for example, a user's speech therapist might receive valuable insights about the health of facial nerves, facial muscles, neurological symptoms (e.g. twitches, seizures, etc.) which might in turn guide, improve and/or accelerate the user's therapy.

This kind of facial, and body language, monitoring capability can also provide feedback to a user, or to the user's doctor or therapist, as to the efficacy of treatments and/or therapies being administered to the user with respect to any number of neurological, psychological, speech and/or other health-related conditions.

B. Detail Description of Embodiments of the Disclosure

Figure 1:
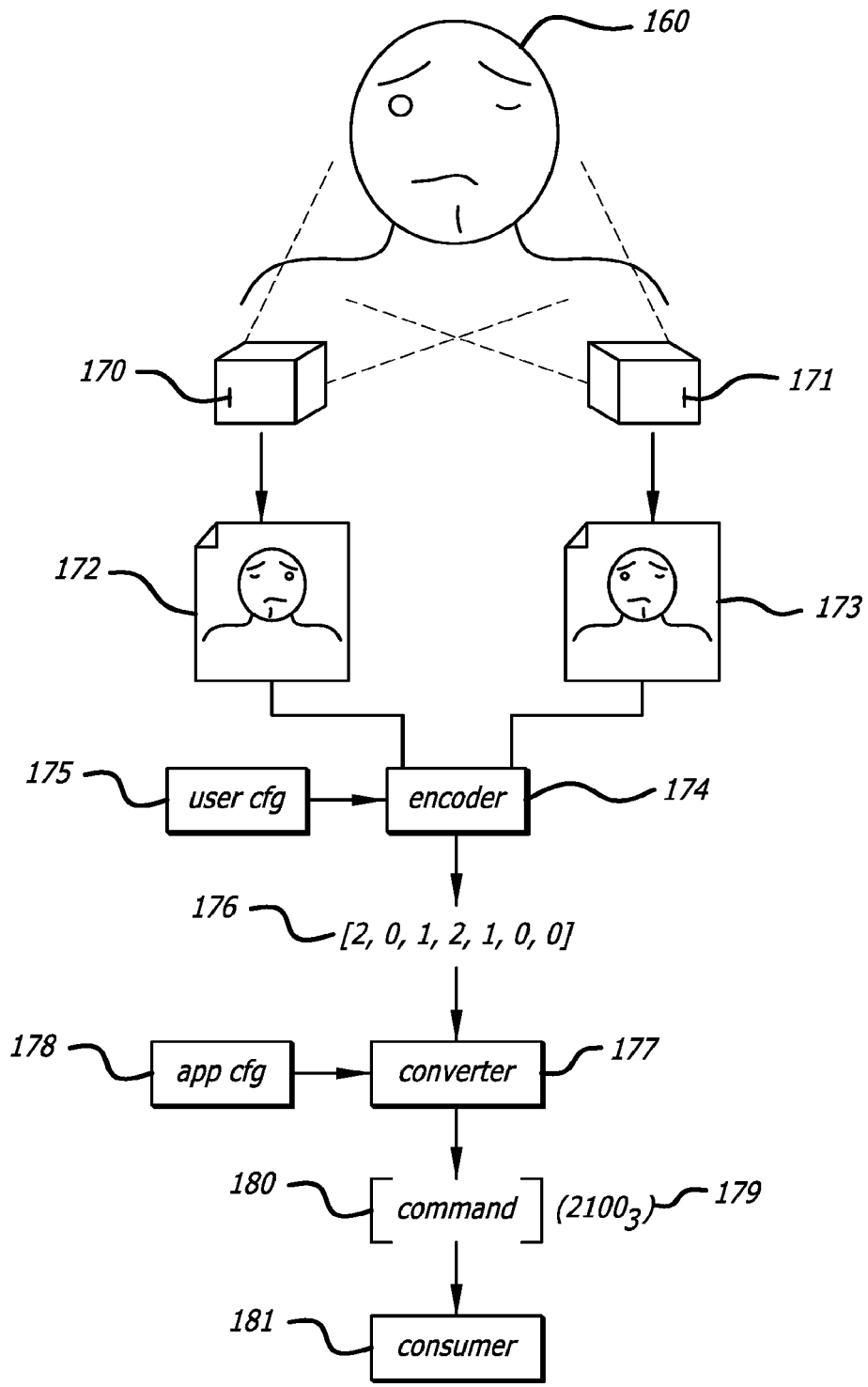
FIG. 1 is an illustration of an exemplary embodiment of the present disclosure. A user is generating a command for the embodiment's operating system, or for an application running within the embodiment, using only contortions of his face, head, neck and shoulders.

FIG. 1 is an illustration of an exemplary embodiment of the present disclosure. A user 160 is generating a command for the embodiment's operating system, or for an application running within the embodiment, using only movements of the seven signal features illustrated, and discussed in reference to, FIG. 4.

User 160 is executing the same non-zero signal configuration as is illustrated, and discussed in reference to, FIG. 5. The embodiment has two cameras 170 and 171 each capturing images 172 and 173 of user 160 from different perspectives. Such a two-camera embodiment might be implemented as a pair of cameras at the upper left and right corners of a smartphone. Each would see the user from a unique angular offset with respect to the user's face. Cameras 170 and 171 are arranged so that the images produced 172 and 173 capture a stereoscopic perspective of the user. Such a stereoscopic perspective allows a partial 3D reconstruction of the user's face, head, neck and upper torso to be generated.

A 3D reconstruction or model of the user's face, neck, head and upper torso allow any volumetric changes, such as those that would be caused by the contraction or relaxation of a muscle, and/or any changes in the relative positions and/or orientations of other signal features (e.g. changes in the convexity or concavity of the user's cheeks), to be determined with relative ease and accuracy.

Each camera sends each image it captures to the encoder module 174. The encoder module 174 is initialized with a "user configuration" file 175 which specifies which signal features this user 160 prefers and is most adept at executing. In this case, the user configuration file 175 specifies that this user 160 prefers to use the seven signal features already illustrated, and discussed in reference to, FIG. 4.

Using the preferences specified in the user configuration file 175, the encoder module 174 analyzes the images 172 and 173 and identifies, and measures the states of, the requisite seven signal features. At the conclusion of its analysis, encoder module 174 outputs an array 176 (i.e. a "change signature") of component signal values (i.e. of "quantized factor measures"), which, with respect to this component signal configuration (i.e. the same as illustrated in FIG. 5) are (2, 0, 1, 2, 1, 0, 0).

In this embodiment, the converter module 177 is initialized with an "application configuration" file 178. And, in this example, this application configuration file specifies that only the 4 lowest-order signal values are to be used to generate the composite signal value. The change signature 176 is sent from the encoder module 174 to the converter module 177 where (in this case) a context-specific composite signal value 180 is generated from the truncated portion 179 designated by the application configuration file 178.

In this example, the lowest-order component signal values are $\{2, 1, 0, 0\}$. Because these are base-3 bits, this composite signal value of $2100_3$ corresponds to a decimal value of 63, i.e. $(2 \times 27)+(1 \times 9)+(0 \times 3)+(0 \times 1)=63$.

The converter module 177 transmits the numeric value 63 to a "consumer" 181, where it is interpreted and the corresponding command is executed.

In this example, the "consumer" could be an application, the device operating system, a network interface module, etc.

FIG. 2 is an illustration of the Sagittal, Frontal and Transverse planes, which are used to define and discuss the relative locations of muscles and other features of the human body, as well as the orientation of translocations of those features.

FIG. 3 is an illustration of some of the muscles that give rise to facial expressions, movements, and changes to the geometry of a person's face. This illustration is in the public domain and is found in "Sobotta's Atlas and Text-book of Human Anatomy" published in 1909. The illustration was created by K. Hajek and A. Schmitson.

FIG. 4 is an illustration of seven user-controlled bodily signals used by an exemplary embodiment of the present disclosure. While this illustration is only intended to characterize these signals, one might nevertheless imagine that the illustration is representative of the type of image that might be captured by a camera incorporated within, or connected to, the embodiment.

A user 100 is in a relaxed posture in which each component signal value (please see Table 1 above) has a value of zero. The user 100 generates the first component signal value by tilting 101, left or right, the user's head 100. The user 100 generates the second component signal value by rotating 102 his head to the left or right (about the vertical, longitudinal axis of his body) as if glancing in the respective direction.

The user 100 generates the third component signal value by shrugging 103 (i.e. raising) his left or right shoulder. The user 100 generates the fourth component signal value by either raising or lowering (i.e. scowling) his eyebrows 104. The user 100 generates the fifth component signal value by closing either his left 105 or right eye. (Ignoring the simultaneous closing of both eyes allows the user to blink without generating spurious input to the embodiment.)

The user 100 generates the sixth component signal value by slightly, or significantly, opening his mouth 106. And, the user 100 generates the seventh component signal value by laterally shifting 107 his chin to the left or right.

FIG. 5 is an illustration of the same user 100 illustrated in FIG. 4 when that user 110 is generating a non-zero composite signal value. The value of the first component signal value 111 is zero as the head is not tilted to the left or right. The value of the second component signal value 112 is zero as the head is neither rotated to the left nor right. The value of the third component signal value 113L and 113R is 1 because the user's right shoulder is raised (and the user's left shoulder is relaxed). (If the user's right shoulder had been relaxed, and the user's left shoulder had been raised, then the value of the signal would have been 2.)

The value of the fourth component signal value 114 is 1 because both eyebrows are raised. The value of the fifth component signal value 115 is 2 because the user's left eyelid is closed, and the right eyelid is open. The value of the sixth component signal value 116 is zero because the user's mouth is closed. And, the value of the seventh component signal value 117 is 2 because the user's chin is shifted laterally to a position left of the user's nose.

Thus, the component signal configuration illustrated in FIG. 5 would correspond to component signal values (i.e. to "quantized factor measures") of {0, 0, 1, 1, 2, 0, 2}.

The algorithm to convert such a set of raw component signal values into a "composite" signal value is arbitrary. For instance, the order of component signal values is arbitrary, as long as it consistent with respect to any particular interpretation and/or application of the composite signal value. Likewise, the determination of which of the great number of potential component signals to collect from a user, and upon which user-generated composite signal values will be based, is also arbitrary. (However, it is likely helpful to allow users the freedom to specify which component signal values they prefer, e.g. which are easiest for them to execute and/or remember.)

The assignment of values to the different states associated with each component signal value is also arbitrary. In the above example, the value of zero has been associated with the state representing the relaxed or neutral posture of the user. However, any state (including the neutral state) of each component signal value could have been assigned any appropriate value. In this case, in which there are three potential states for each component signal value, the appropriate values would range from 0 to 2, inclusive.

FIG. 6 is an illustration of an exemplary embodiment of the present disclosure. A user 120 is generating music using only movements of four signals. The muscular contractions with which the user specifies the four signals are detected and measured with sensors attached to his skin.

This exemplary embodiment detects and measures the states of the user's signal features through the use of signals generated by "contact sensors" (121-126). Alternate embodiments employ contact sensors that detect and measure the electrical signals (voltage, capacitance, and/or current) associated with neural innervations. Other alternate embodiments employ contact sensors that detect and measure the electrical signals (voltage, capacitance, and/or current) associated with the contractions of muscles. Still other alternate embodiments employ contact sensors that detect and measure changes in the strengths of magnetic fields such as those that might be associated with the innervations of nerves and/or the contractions of muscles. Still other alternate embodiments employ contact sensors that detect and measure stretching and/or bending.

Regardless of their mode of operation, these sensors detect and measure, directly and/or indirectly, specific changes in the geometry of a user's face, head, neck, and/or shoulders that are used by the user to specify the codes that will communicate input values to their respective embodiments.

In the exemplary embodiment of FIG. 6, the contact sensors transmit their state (e.g. the magnitude of the strain and/or electrical activity that they are detecting) by radio 127 (e.g. by Wi-Fi) to a receiver 128 connected to the embodiment. The signals received at each moment (designated by the temporal reference line 130) are recorded in a memory 129 that is analyzed by a module 131 that converts (e.g. "quantizes") the raw sensor signals into an array 132 of "quantized factor measures" which serves as a "change signature" which defines a unique combination of factor-specific geometrical alterations to the user's face, head, neck, and/or shoulders. The change signature is then converted, by a conversion module 133, to its corresponding embodiment- and/or application-specific "symbolic value" 134, which in this illustration is a specific musical chord. This exemplary embodiment then processes the user-specified symbolic value 134 by synthesizing, in a synthesizer module 135, and outputting with a speaker 136 as sound 137, the indicated musical sound.

The user illustrated in FIG. 6 has specified, and communicated to the embodiment, the symbolic value of "guitar (chord) A #". He has done this through his specification, via the alteration of the geometry of his face, head, neck, and shoulders, of the corresponding value-specific code, "0, 1, 1, 0".

The user 120 has specified the value-specific code of 0, 1, 1, 0 through his execution of four specific (i.e. four factor-specific) changes to the geometry of his face, head, neck, and shoulders. The correspondence of the geometrical changes to their associated factor-specific codes are consistent with the codes specified in the following table.

TABLE 4

|   | body part | signal = 0 | signal = 1 | signal = 2 |
|---|---|---|---|---|
| 1 | shoulders | left relaxed right raised | both relaxed | left raised right relaxed |
| 2 | eyebrows | both relaxed | both raised | both furrowed (as if angry) |
| 3 | eyelids | both open or closed | left closed right open | left open right closed |
| 4 | lateral position of lower jaw | left of nose | centered under nose | right of nose |

The first signal feature is specified in row 1 of the above table, i.e. the raising of the left or right shoulder, or of neither shoulder. Two contact sensors 121 detect the raising of the user's left 121L and right 121R shoulders. In the illustration, the user's right shoulder is raised while his left shoulder is relaxed. As indicated in the above table, this corresponds (per arbitrary definition) to a signal value of 0.

The second signal feature is specified in row 2 of the above table, i.e. the raising of both eyebrows, or a scowl, or both eyebrows relaxed. One contact sensor 124 detects the raising or lowering of the user's eyebrows. In the illustration, the user's eyebrows are raised. As indicated in the above table, this corresponds (per arbitrary definition) to a signal value of 1.

The third signal feature is specified in row 3 of the above table, i.e. the closing of one eye or the other, or both eyes open (or closed). Two contact sensors 125 detect the opening and closing of the user's left 124L and right 124R eyelids. In the illustration, the user's right eye is open while his left eye is closed. As indicated in the above table, this corresponds (per arbitrary definition) to a signal value of 1.

The fourth, and final, signal feature is specified in row 4 of the above table, i.e. the lateral sliding of the jaw and chin to the left or right, or a relaxed and centered jaw and chin. Two contact sensors 126 detect the movement of the user's jaw to the user's left 126L and right 126R. In the illustration, the user's jaw is displaced to the user's left. As indicated in Table 1, this corresponds (per arbitrary definition) to a signal value of 0.

Thus, in the illustration, and within the context of the arbitrarily-selected component signal values, the user 120 illustrated in the figure is conveying to the device a set of component signal values of $\{0, 1, 1, 0\}$.

Each of the contact sensors (121-126) continuously sends 127 its state to a receiving module 128 in the device. That receiving module 128 continuously transmits the current set of raw, possibly analogue, sensor values 129, having current values indicated by the timestamp 130, to an encoder 131 that converts the raw data transmitted by the contact sensors to the receiver into pre-defined component signal values 132.

The encoder determines which of the potential component signal values, associated with each component signal, best matches the raw (possibly analogue) value transmitted by each respective sensor. For instance, in the embodiment of this illustration, each component signal value has three potential "encoded" values: 0, 1 and 2, corresponding to three potential ranges of raw sensor values (e.g. "relaxed", "left" and "right"). If this embodiment were based on component signals that each had a range of five values, e.g. 0-4, then the encoder would attempt to transform each sensor's (or corresponding pair of sensors') raw values into one of five component signal values.

In this embodiment, the pre-defined component signal values 132 are communicated to a converter 133 which generates a single, composite signal value. In this case, four tri-state values are communicated to the converter. This means that the composite signal values can have a maximum of 3*3*3*3, which equals 81, unique values. This corresponds to a 4-bit value in a base 3 number. It corresponds to a base-2, i.e. a binary, number having 6.34 bits of information.

The symbolic value 134, generated by the converter 133 in response to the composite signal value 132 (i.e. the "change signature") of $\{0, 1, 1, 0\}$, and communicated to the synthesizer 135, happens to specify a guitar chord of A #. And, upon receiving this encoded composite signal value from the converter, the synthesizer 135 generates the specified guitar chord and transmits it to an audio output module 136 which outputs the specified sound(s) 137.

If the audio output module 136 is a pair of headphones, then the user 120 will be able to silently create a musical performance, and listen to the music he is creating, using only the movements of four (sets of) facial features to create the music, and not disturbing anyone who might be near him at the time with the potentially unwanted sound of that music.

FIG. 7 is an illustration of an exemplary embodiment of the present disclosure. A user 140 is generating text (e.g. text messages) using only transpositions of seven select components of the geometry of his face, head, neck and shoulders (i.e. the same seven components illustrated in FIG. 4).

A user 140 is executing the same non-zero signal configuration as is illustrated, and discussed in reference to, FIG. 5. The embodiment has a camera 141 that is continuously capturing images 142 of the user's face, head, neck and upper torso. The camera 141 sends each captured image (e.g. each frame of video) to an encoder module 143.

The encoder module 143 is initialized with a "user configuration" file 144 which specifies which signal features this user 140 prefers and is most adept at executing. In this case, the user configuration file 144 specifies that this user 140 prefers to use the seven signal features illustrated, and discussed in reference to, FIG. 4.

Using the preferences specified in the user configuration file 144, the encoder module 143 analyzes the image 142 and identifies, and measures the states of, the requisite seven signal features. At the conclusion of its analysis, encoder module 143 outputs an array 145 of quantized factor measures, which, with respect to this component signal configuration (i.e. the same as in FIG. 5) are $\{2, 0, 1, 2, 1, 0, 0\}$.

Please note that the sequence of component signal values for this user-signal-feature configuration is $\{2, 0, 1, 2, 1, 0, 0\}$ and not $\{1, 0, 0, 0, 2, 2, 2\}$ (which was the sequence associated with the set of component signal values associated with FIG. 5).

In this embodiment, the user configuration file 144 specifies not only WHICH signal features this user prefers to use, but also the RANKED ORDER of those signal features. For instance, a user might elect to have those two or three signal features with which he is most comfortable and adept be used as the lowest-order bits. He may also elect to have the one or two signal features with which he is least comfortable be used as the highest-order bits.

In the signal feature configuration illustrated in FIGS. 4 and 5, the (default) ranked order of the individual features is:

TABLE 5

| Signal Feature | Row in Table 1 | Value in FIG. 5 | Order of bit |
|---|---|---|---|
| head tilt | 0 | 0 | highest |
| head rotation | 1 | 0 | |
| shoulders | 2 | 1 | |
| eyebrows | 3 | 1 | |
| eyelids | 4 | 2 | |
| mouth | 5 | 0 | |
| chin/jaw | 6 | 2 | lowest |

In this case, the user has elected to use the same seven signal features as those illustrated in FIGS. 4 and 5. However, contrary to the example illustrated in FIGS. 4 and 5, this user 140 has elected to assign a different ranked order (i.e. preference) to these seven signal features. And, those preferences have been stored in, and read from, the user configuration file 144. And, they have been used by the encoder module to select which signal features to search for, and measure, in each image 142 passed to it by the camera 141. Therefore, because of this user's preferences, the component signal values are output in the order:

TABLE 6

| Signal Feature | Row in Table 1 | Value in FIG. 5 | Order of bit |
|---|---|---|---|
| chin/jaw | 6 | 2 | highest |
| head rotation | 1 | 0 | |
| shoulders | 2 | 1 | |
| eyelids | 4 | 2 | |
| eyebrows | 3 | 1 | |
| mouth | 5 | 0 | |
| head tilt | 0 | 0 | lowest |

The array 145 of ranked quantized factor measures is sent from the encoder module 143 to the converter module 146 where (in this case) an application-specific composite signal value 148 is generated, in this embodiment, the converter module 146 is initialized with an "application configuration" file 147. And, in this example, this application configuration file 147 specifies that only the 4 lowest-order signal values are to be used to generate the composite signal value 149.

In this example, the lowest-order component signal values are {2, 1, 0, 0}. Because these are base-3 bits, this composite signal value of $2100_3$ corresponds to a decimal value of 63, i.e. (2×27)+(1×9)+(0x3)+(0x1)=63. And, 63 is the numeric value of the ASCII character '?' (i.e. a question mark).

The converter module 146 transmits the numeric value 63 (i.e. the ASCII value for a question mark) to a text editing module 150, where it is appended to the text that user 140 is composing.

FIG. 8 is an illustration of a user 190 using an exemplary embodiment 191 of the present disclosure, in which the embodiment is similar to a smartphone in size.

User 190 holds the device embodiment 191 in front of his face, thus allowing the selfie camera(s) to capture image(s) of his face, head, neck and upper torso. User 190 is delivering the audio (if any) generated by the device 191 to his ears through a pair of headphones 192, thus avoiding the possibility that any person(s) nearby will be able to overhear that audio, and/or preventing any person(s) nearby from gaining access to any of his proprietary information that might be disclosed within the audio (e.g. remarks from a person with which user 190 is having a "silent" (though audible to the participants) conversation.

FIG. 9 is a flow chart illustrating some of the steps executed by an exemplary embodiment of the present disclosure so as to enable a user to input commands and/or data to the embodiment, its operating system, and/or to an application being executed within the embodiment (i.e. to a "consumer") through the generation of "signals." The consumer then processes each composite signal value.

The embodiment shown generally at 200 uses its at least one sensor (i.e. "detector") to acquire data about the geometry of the user's face, head, neck, and/or shoulders, the muscles therein, and/or the nerves therein. In the embodiment shown generally at 201 at least one sensor sends its data to a module within the embodiment that 202 determines the "quantized" states of the component features of the user that it uses to generate, and subsequently 203 transmit to the converter module, with respect to the set of component features, the corresponding set (i.e. array) of "quantized factor measures". At the embodiment shown generally at 204 the converter module converts the array of quantized factor measures (i.e. the "change signature") into an embodiment-specific, and/or an application-specific, symbolic value. At the embodiment shown generally at 205 the converter module transmits the symbolic value to the appropriate "consumers" within the embodiment and/or application for processing in the appropriate manner, e.g. through the addition of the character specified by the symbolic value into a document being edited by the user.

FIG. 10 is a flow chart illustrating some of the steps executed by an exemplary embodiment of the present disclosure so as to enable a user to input commands and/or data to the embodiment, its operating system, and/or to an application being executed within the embodiment (i.e. to a "consumer") through the generation of "signals." This embodiment allows a user to customize the encoder module, through its initialization with a file specifying user preferences, e.g. specifying which signal features the user prefers. The encoder module is also customized to rank, by user preference, the order in which the resulting component signal values are transmitted to the converter module.

The steps illustrated here also differ from those of FIG. 9 in that the converter's behavior is customized, through its initialization with an "application configuration" file, to synthesize from the component signal values passed to it by the encoder, a composite signal value appropriate to the "consumer" application or operating system.

The embodiment shown generally at 300 permits a user of the embodiment to specify preferences, so as to customize the embodiment and facilitate her own use of it. These preferences are stored in a "user configuration" file. The embodiment shown generally at 301 initializes an encoder module with the preferences specified within the user configuration file associated with the embodiment's user. The embodiment shown generally at 301 initializes a converter module with a file containing preferences, and/or other customization parameters, associated with an application that the user is executing on the embodiment. Steps 302-307 are identical to steps 200-205 described in FIG. 9.

FIG. 11 illustrates the differences between a "face tracking," "eye tracking" and/or "retinal tracking" system and the present disclosure. As illustrated in FIGS. 11_1 and 11_2 a change in the orientation of a user's face, body and/or "direction of gaze" is sufficient to alter the value (e.g. the horizontal (y) screen coordinate of a cursor) input to the system in response to the alteration of the user's appearance from the system's perspective.

By contrast, as illustrated in FIGS. 11_3 and 11_4, a change in the orientation of a user's face, body and/or "direction of gaze" is not sufficient to alter the value generated within an exemplary embodiment of the present disclosure with respect to a spatial configuration of the user's face and/or body—only an alteration in the spatial configuration of the user's face and/or body, relative to the user himself, can alter the value encoded therein.

FIG. 11 illustrates the independence of the symbolic values encoded and communicated by a user 200 to the an exemplary embodiment 206 of the present disclosure from the orientation of the user's face, body and/or body parts relative to the exemplary embodiment and/or to the cameras and/or other sensors utilized by the exemplary embodiment to detect the spatial configurations and/or contortions of the user's body and/or body parts.

FIG. 11_1 shows a user 200a, 208a, and 212a controlling the position of a cursor 214a on the display 206a and 210a of a "retinal-tracking" computerized device. A camera 207a and 211a attached to the display 206a and 210a monitors the location of the user with respect to the camera's line of sight (normal to the plane of the display 206a and 210a), as well as the direction of the user's gaze 205a, 209a, and 213a. The device interprets the user's direction of gaze, in conjunction with the location of the user's eyes relative to the camera and display, in order to move the cursor 214a to the position on the display 210a at which the user is looking.

FIG. 11_2 shows the result of the user 200b, 208b, and 212b re-orienting his head relative to the display 206b and 210b. The spatial configuration of his head (200b, 208b and 212b), and the parts therein (201b, 202b, and 203b), are unchanged relative to the user's bodily frame of reference (with respect to their configuration in FIG. 11_1). However, the device of FIG. 11_2 interprets the user's altered direction of gaze (205b, 209b and 213b) as the user's specification of a new cursor position 214b.

FIG. 11_3 shows a user 200c, 208c, and 212c composing text 214c on the display 206c and 210c of an exemplary embodiment of the computerized facial- and/or bodily-decoding system of the present disclosure. A camera 207c and 211c attached to the display 206c and 210c monitors the face 200c and/or body of the user. The embodiment interprets that spatial configuration of the parts (e.g. 201c, 202c and 203c) of the user's face and/or body, that it has associated with specific binary values, as specific characters (and/or other textual elements like words, phrases, etc.). In this case, the embodiment has interpreted the user's facial configuration 201c, 202c and 203c as specifying the character "A" 214c.

FIG. 11_4 shows the lack of effect on the behavior of an exemplary embodiment of the present disclosure caused by the user 200d, 208d, and 212d re-orienting his head relative to the display 206d and 210d. The spatial configuration of his head (200b, 208b and 212b), and the parts therein (201b, 202b, and 203b), are unchanged relative to the user's bodily frame of reference (with respect to their configuration in FIG. 11_3). And, because the exemplary embodiment interprets facially and/or bodily encoded values without regard to the orientation of the user relative to the embodiment and/or its sensors, the value input to the embodiment, and the text generated in response thereto, is the same as that generated in FIG. 11_3. Note that an alternate embodiment does not generate the second "A" 214d character in the absence of an intervening indication that the user's submission of the first "A" 214c character had been concluded (e.g. through a sufficiently long pause or delay, through the user's alteration and subsequent recreation of the "A" facial configuration, etc.).

FIG. 12 illustrates the differences between a "face tracking," "eye tracking" and/or "retinal tracking" system and the present disclosure. As illustrated in FIGS. 12_1 and 12_2 an alteration in the orientation of a user's face and/or body, relative to the retinal-tracking system and/or its camera, if matched by a "complementary" alteration in the "direction of gaze", can result in the specification of the same value (e.g. the horizontal (y) screen coordinate of a cursor).

By contrast, as illustrated in FIGS. 12_3 and 12_4, a change in the spatial configuration of a user's facial and/or body parts, relative to the inherent frame of reference of the user's body, will always result in the specification, by an exemplary embodiment of the present disclosure, of a different value (unless neither configuration specifies a valid code, in which case they will both be equally insubstantial).

FIG. 12_1 shows a user 300a, 308a and 312a controlling the position of a cursor 314a on the display 306a and 310a of a "retinal-tracking" computerized device computerized device. A camera 307a and 311a attached to the display 306a and 310a monitors the location of the user with respect to the camera's line of sight (normal to the plane of the display 306a and 310a), as well as the direction of the user's gaze 305a, 309a, and 313a. The device interprets the user's direction of gaze, in conjunction with the location of the user's eyes relative to the camera and display, in order to move the cursor 314a to the position on the display 310a at which the user is looking.

FIG. 12_2 shows the result of the user 300b, 308b, and 312b re-orienting his head relative to the display 306b and 310b. However, unlike the situation illustrated in FIG. 11_2, in this case, the user 300b, 308b, and 312b has modified his "direction of gaze" such that the retinal-tracking system interprets the new combination of the user's camera-specific relative orientation, in combination with the user's modified facial configuration, as specifying the same input value, i.e. the same cursor position, as that specified in FIG. 12_1.

FIG. 12_3 shows a user 300c, 308c, and 312c composing text 314c on the display 306c and 310c of an exemplary embodiment of the present disclosure. A camera 307c and 311c attached to the display 306c and 310c monitors the face 300c and/or body of the user. The embodiment interprets that spatial configuration of the parts (e.g. 301c, 302c and 303c) of the user's face and/or body, that it has associated with specific binary values, as specific characters (and/or other textual elements like words, phrases, etc.). In this case, the embodiment has interpreted the user's facial configuration 301c, 302c and 303c as specifying the character "A" 314c.

FIG. 12_4 shows the effect on the behavior of an exemplary embodiment of the present disclosure caused by the user 300d, 308d, and 312d re-orienting his head relative to the display 306d and 310d. The spatial configuration of his head (300b, 308b and 312b), and the parts therein (301b, 302b, and 303b), are altered with respect to the user's bodily frame of reference (with respect to their configuration in FIG. 12_3). And, because the exemplary embodiment interprets facially and/or bodily encoded values without regard to the orientation of the user relative to the embodiment, and/or its sensors, the value input to the embodiment, and the text (i.e. "B") generated in response thereto, is now different than the value, and corresponding text (i.e. "A") generated in FIG. 12_3.

FIG. 13 illustrates the invariance in the values interpreted by an exemplary embodiment of the present disclosure in response to a user moving relative to the embodiment and/or to its camera(s). The exemplary embodiment associates the same value with the unchanging spatial configuration encoded on the face of the user despite the user's movement through the field of view of the embodiment and/or its camera(s).

FIG. 13_1 illustrates a user 400a, 408a located in the left-most portion of the camera 407a of an exemplary embodiment 406a of the present disclosure. The user is moving from left to right across the camera's field of view with the velocity 417a. The user 400a is looking "straight ahead" 405a while communicating to the embodiment a signal encoded by the eyebrows 401a, the eyelids 402a, and the upper and lower lips 403a. This geometrical configuration of the user's face would result in the embodiment's generation and processing of a particular symbolic value, e.g. "V".

FIG. 13_2 illustrates the same user 400a, 408a now 408b, 401b located in the central portion of the camera 407b of the exemplary embodiment 406b of the present disclosure. The user is still moving from left to right across the camera's field of view with the velocity 417b. The user 400b is still looking "straight ahead" 405b while communicating to the embodiment the same signal encoded by the eyebrows 401a, the eyelids 402a, and the upper and lower lips 403a. This geometrical configuration of the user's face will still result in the embodiment's generation and processing of the same symbolic value, e.g. "V", generated in FIG. 13_1.

FIG. 13_3 illustrates the same user 400a, 408a now 408c, 401c located in the right-most portion of the camera 407c of the exemplary embodiment 406c of the present disclosure. The user is still moving from left to right across the camera's field of view with the velocity 417c. The user 400c is still looking "straight ahead" 405c while communicating to the embodiment the same signal encoded by the eyebrows 401a, the eyelids 402a, and the upper and lower lips 403a. This geometrical configuration of the user's face will still result in the embodiment's generation and processing of the same symbolic value, e.g. "V", generated in FIGS. 13_1 and 13_2.

FIG. 14 illustrates the invariance in the values interpreted by an exemplary embodiment 506b, 507b of the present disclosure in response to accelerations of the user 500b, either in absolute terms (i.e. relative to the Earth) or in relative terms (i.e. relative to the embodiment, device and/or its cameras). A "head-orientation-tracking" system like the one illustrated in FIG. 14_1 will alter the value(s) input to the system, and/or the system's interpretation of those values, in response to the acceleration (absolute and/or relative) of the user 500a, his head, and/or the system, device and/or its cameras.

By contrast, an exemplary embodiment of the present disclosure generates input solely in response to the spatial configurations (of the face, head, body, etc.) generated by the user with respect to the user's inherent, bodily frame(s) of reference. Therefore, with respect to this exemplary embodiment, an acceleration (absolute and/or relative) of the user, his head, and/or the embodiment, and/or its cameras, will not alter the value generated, nor its subsequent interpretation, by the embodiment, if the spatial configuration of the user's face, head, body, etc., remains constant.

FIG. 14_1 illustrates an embodiment of a "head-orientation-tracking" system 506. This embodiment controls the presentation of a virtual landscape 510a to the user, and adjusts the perspective presented so that it matches the rotations (i.e. the rotational accelerations) to which the user's head 500a, 508a is subjected.

Initially, the system 506a1 displays a view 510a1 of a virtual world in which the user 512a1 can see a tree 514a1 as he faces 521a1 the display. This system possesses a camera 511a1, but does not respond to the geometry of the user's 500a eyebrows 501a, or other facial features. The user 500a is looking 505a directly at the camera 507a1.

As the user rotates his head 508a from its original orientation 508a1 counter-clockwise to a new orientation 508a2, the position of the "head-orientation-tracking" system 506a1 also rotates about the same axis of rotation (i.e. the longitudinal axis of the user) to a new position 507a2. Whereas the system was originally presenting a view 517a1, 510a1 to the user 512a1, after the rotation of the user and the system, the system is now presenting the view 517a2, 510a2 to the user 512a2. In this altered view 510a2, the user 512a2 can now see a house 520, and the tree which was originally on the right side 514a1 of the presented view 510a1, is now 514a2 on the left side of the view 510a2.

By contrast FIG. 14_2 illustrates an exemplary embodiment 506b1 of the present disclosure. This embodiment facilitates the user's 500b, 508b composition of text (i.e. a text editor).

Initially, the system 506b1 displays a view 510b1 of the document being edited, showing the addition of a single letter "A" 514b1. This embodiment possesses a camera 511b1, that detects and responds to at least the geometry of the user's 500b eyebrows 501b. The user 500b is looking 505b directly at the camera 507b1.

As the user rotates his head 508b from its original orientation 508b1 counter-clockwise to a new orientation 508b2, the position of the embodiment 506b1 also rotates about the same axis of rotation (i.e. the longitudinal axis of the user) to a new position 507b2. Whereas the system was originally presenting a view 517b1, 510b1 to the user 512b1, after the rotation of the user and the system, the system is now presenting the same view 517b2, 510b2 to the user 512b2. In this altered view 510b2, because the geometry of the user's face 500b remained unchanged through the rotation, the document that he was editing has now appended an additional letter "A" 514b2.

FIG. 15 illustrates the invariance in the values generated and/or interpreted by an exemplary embodiment 606 of the present disclosure in response to a motion, even to a "reciprocating" motion, of the user 600, the user's face, or any other body part(s) of the user, with respect to the embodiment and/or its sensor(s).

FIG. 15_1 shows the camera 607a of the embodiment 606a regarding the user 608a, wherein the distance of the user's head from the camera is "dA". The normal 604a of the user's face 600a is parallel to the normal of the camera's 607a field of view. The user 600a is looking 605a directly at the camera. The user has a facial geometry consisting of raised eyebrows 601a, fully open eyelids 602a, and slightly separated upper and lower lips 603a. The user's facial geometry would evoke from the embodiment a specific symbolic value, e.g. "green".

In FIGS. 15_2 and 15_3, the user 600b, 600c moves directly toward the camera 607b, 607c. Decreasing, in the process the distance of the user's head from the camera to "dB" and then "dC". However, the user's facial geometry remains unchanged. And, the embodiment would continue to generate the same symbolic value, e.g. "green", as was generated in FIG. 15_1.

In FIGS. 15_4 and 15_5, the user 600d, 600e moves directly away the camera 607d, 607e. Increasing, in the process the distance of the user's head from the camera from "dC" to "dD" and then "dE". However, again, the user's facial geometry remains unchanged. And, the embodiment would continue to generate the same symbolic value, e.g. "green", as was generated in FIGS. 15_1-15_3.

Despite the reciprocating motion of the user 600 toward, and then away, from the camera of the embodiment, the symbolic value(s) generated remained unchanged since its definition was only dependent upon the geometry of the user's face, which remained unchanged throughout the reciprocating motion.

FIG. 16 illustrates a user's generation of a sequence of values with respect to the present disclosure.

User 700a communicates to an exemplary embodiment of present disclosure the symbolic value "F" as a consequence of the illustrated raised eyebrows 701a, slightly open mouth 703a and non-tilted head 720a. The user 700a holds this geometry for a period of "t0".

User 700 then transitions 721ab, over the period "t1", from geometry 700a to geometry 700b. During period "t2" user 700b holds the geometry: furled eyebrows 701b, closed mouth 703b, and a right head tilt 720b, which is interpreted by the embodiment as the symbolic value "A" 714b.

User 700 then transitions 721bc, over the period "t3", from geometry 700b to geometry 700c. During period "t4" user 700c holds the geometry: relaxed eyebrows 701c, fully open mouth 703c, and a left head tilt 720c, which is interpreted by the embodiment as the symbolic value "C" 714c.

User 700 then transitions 721cd, over the period "t5", from geometry 700c to geometry 700d. During period "t6" user 700d holds the geometry: raised eyebrows 701d, closed mouth 703d, and no head tilt 720d, which is interpreted by the embodiment as the symbolic value "E" 714d.

User 700 then transitions 721de, over the period "t7", from geometry 700d and back to the same geometry as 700d. During period "t8" user 7003 again holds the same 700d geometry: raised eyebrows 701e, closed mouth 703e, and no head tilt 720e, which is interpreted by the embodiment as the same symbolic value "E" 714e.

FIG. 17 illustrates the utility of an exemplary embodiment of the present disclosure. In this example, the user 800 cannot use his left hand 822, nor the fingers thereon, to enter text into his smartphone 806 because that hand 822 is holding a briefcase 824. He cannot use his right hand 823, nor the fingers thereon, to enter text into his smartphone 806 because his view 805 is fixated on a subject (off page to the left) that he is observing. He cannot speak a message regarding the subject he is surveilling since that might alert the subject to his surveillance. And, he cannot even see the screen 807 of his phone 806 since he is looking 805 at the subject.

The present disclosure allows him to enter text, thereby possibly composing a message to a confederate, using only patterns of contortions of muscles of his face, head, and/or other body parts. Furthermore, by employing a unique code (e.g. a mapping of bodily spatial configurations to ASCII characters) known only to him and his confederate(s), he can prevent anyone else able to see his facially- and/or bodily-encoded messages from understanding their meaning.

FIG. 18 illustrates the communication of the letters that spell the word "friend" through the use of the American Sign Language (ASL). The signs illustrated are generated and communicated through the presentation of "static" (i.e. unmoving, unchanging) hand configurations.

The letter "f" 906 is communicated through the ASL hand geometry illustrated by the hand 900. And, likewise, the letters "r" 907, "i" 908, "e" 909, "n" 910, and "d" 911, are communicated through the ASL hand geometries illustrated by the hand configurations 901-905 respectively. And, even though ASL does not specify a method or protocol to instruct a user on the proper way to transition 912-916 from each letter to the next, nonetheless those interpreting such signs are able to differentiate them, possibly due to the approximately constant pace with which they are produced and displayed, i.e. due to the approximately equal intervals between each pair of signs.

Likewise, when users generate, and communicate to embodiments of the present disclosure, symbolic values encoded through value-specific geometries of their faces, heads, necks, and/or shoulders, the users are expected to instinctively adopt code generation cycles in which codes are held for consistent periods of time, and the latencies between the generations of successive codes are consistent.

FIG. 19 illustrates the communication of eight different words through the use of the American Sign Language. The signs illustrated are generated and communicated through the presentation of "dynamic" (i.e. moving, fluid) hand configurations for which the presentation of any static portion violates the protocol and would be expected to prevent its understanding by a third party.

Because embodiments of the present disclosure rely on static (and not "moving") geometries of the face, head, neck, and/or shoulders, ASL signs (some of which are "moving" and utilize a user's hands) would not conform to its design and could therefore not be understood by an embodiment.

FIG. 20 illustrates an ATM embodiment 1006 of the present disclosure in which a customer 1000 communicates his password, or a portion thereof, to the embodiment through alterations in the geometry of his face, head, neck, and/or shoulders. In this illustration, the user 1000 is presenting to the embodiment, raised eyebrows 1001, a closed mouth 1003, fully open eyes, thereby communicating to the embodiment 1006 through its camera 1007, one symbolic value which presumably represents one part of the user's password and/or passphrase. This communication of the user's password, or a portion thereof, through geometrically encoded signals, could be done in conjunction with the entry of another password, of a portion of the same password, through the use of the user's finger 1028 to press keys on the embodiment's keyboard 1026.

During the user's communication of his password, the embodiment detects, analyzes and translates four geometrical configurations of the user's face, head, neck, and shoulders, illustrated in the representative images of the user 1020a-1020d. The geometries captured in the images of the user are translated into the symbolic values "p" 1022a, "o" 1022b, "G" 1022c, and "0" (zero) 1022d.

If confirmed as accurate by the embodiment, the user may be allowed to conduct a financial transaction thereon.

FIG. 21 illustrates an embodiment 1107 of the present disclosure in which a worker 1100 is communicating with a third party (e.g. another person) by means of symbolic values encoded by him through changes in the geometry of his face, head, neck, and/or shoulders, thus being able to communicate to the third party from within an environment so noisy 1141 that vocal communication would not be understood by the other party.

The worker 1100 is operating, with both hands 1127L and 1127R, a jack hammer 1142, which jumps up-and-down 1140, producing excessive noise 1141. In order to protect his hearing, the worker 1100 wears sound-proof ear coverings 1130L and 1130R which contain speakers that allow him to hear the words spoken to him by the party he is talking to via his embodiment 1107 of the present disclosure.

The embodiment 1107 captures images 1120 of his face and shoulders and translates specific components of his facial geometry, such as with respect to his eyebrows 1101 and lips 1103, in order to issue to the other party textual comments, or synthesized spoken words. The other party's replies might be heard by the user 1100 through speakers in his ear coverings 1130.

The user must use both of his hands 1127L and 1127R to control the violent tool 1142, so he is unable to produce text messages using his fingers and/or the virtual keyboard on a smartphone. And, because of the dangerous nature of his work, he must carefully watch the interaction of the tool with the ground below, which would prevent him from observing the display on a smartphone in order to compose such text messages.

The embodiment transmits 1131 the user's messages (textual and/or synthesize vocals) to a cell tower or other compatible radio receiver.

FIG. 22 illustrates an embodiment 1207 in which an artist 1200 is composing a digital image on the embodiment's display 1210 through the issuance to the embodiment of color values encoded by him through alterations to the geometry of his face, head, neck, and/or shoulders (as illustrated in a representative image 1254 captured, analyzed, and interpreted, by the embodiment. He is also using gestures in order to simultaneously control the motion of a virtual paintbrush. The user 1200 uses at least the geometry of his eyebrows 1201, eyelids 1255, and lips 1203, to specify geometries that designate particular, user-selected symbolic values, which, with respect to this embodiment are colors (e.g. specified as values of RGB).

This embodiment also incorporates an understanding, and an ability to detect and interpret, various gestures executed by the user with his left 1227L and right 1227R hands, through appropriate motions of each hand, 1228L and 1228R, respectively, toward and away from the embodiment's camera in order to control the movements of the cursor, e.g. from position 1253 to position 1214.

This embodiment also incorporates the ability to alter the perspective of the view displayed to the user in response to rotations 1221 of the user's head. This allows the user to shift his attention to any portion of a digital image that, in whole 1210L-1200R (at the resolution of the display device) exceeds the size of the display, thereby limiting the view available on the display to only a select portion 1210c of the total image.

FIG. 23 illustrates an embodiment 1350, 1306, 1307 in which a gamer 1300 is adjusting parameters appropriate to his control of his virtual player within the game, and perhaps displayed on the screen 1310 of the game embodiment, through alterations to the geometry of his face, head, neck, and/or shoulders, e.g. through alterations in at least the geometries of his eyebrows 1301, and eyelids 1302, that are detected, analyzed, and interpreted, on the basis of images captured by the embodiment's camera 1307.

User 1300 is unable to use his voice to adjust his private player-specific settings and/or preferences since those commands would be broadcast (e.g. via the internet 1331, 1362), via his microphone 1360, with all of the other cooperating members of his team.

User 1300 is unable to use his hands to manually adjust such player-specific settings and/or preferences since his hands 1327L, 1327R are dedicated to the control of their respective joysticks 1361L and 1361R.

Although the present inventions have been described in terms of preferred and alternative embodiments above, numerous modifications and/or additions to the above-described embodiments would be readily apparent to one skilled in the art. The embodiments can be defined as methods of use or assembly carried out by anyone, any subset of or all of the components and/or users; as systems of one or more components in a certain structural and/or functional relationship; and/or as subassemblies or sub-methods. The inventions can include each of the individual components separately. However, it is intended that the scope of the present inventions extend to all such modifications and/or additions and that the scopes of the present inventions are limited solely by the claims set forth herein.

Individual elements or features of a particular aspect of the present teachings are generally not limited to that particular aspect, but, where applicable, are interchangeable and can be used in other aspects, even if not specifically shown or described. The same may also be varied in many ways. Such variations are not to be regarded as a departure from the present teachings, and all such modifications are intended to be included within the scope of the present teachings.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including" and "having" are inclusive and therefore specify the presence of stated features, integers, steps, operations, elements and/or components, but do not preclude the presence or addition of one or more other features, integers, steps, operations, elements, components and/or groups thereof. The method steps, processes and operations described herein are not to be construed as necessarily requiring their performance in the particular order discussed or illustrated, unless specifically identified as an order of performance. It is also to be understood that additional or alternative steps may be employed.

Although the terms first, second, third and so forth may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second" and other numerical terms when used herein do not imply a sequence or order unless clearly indicated by the context. Thus, a first element, component, region, layer or section discussed below can be termed a second element, component, region, layer or section without departing from the aspects of the present teachings.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (such as "between" versus "directly between," and "adjacent" versus "directly adjacent"). As used herein, the term "and/or" includes any and all combinations of one or more of the associated listed items.

Spatially relative terms, such as "inner," "outer," "beneath," "below," "lower," "upper," "above," "forward," "rearward," "front" and "back" may be used herein for ease of description to describe one element's or feature's relationship to another, but the disclosure is intended to encompass different orientations of the appliance in use or operation in addition to the orientation depicted in the figures. For example, if the appliance in the figures is turned over, elements described as "below" or "beneath" other elements or features would then be oriented "above" the other elements or features. Thus, the example term "below" can encompass both an orientation of above and below. The device may be otherwise oriented (rotated ninety degrees or at other orientations) and the spatially relative descriptors used herein interpreted accordingly.

The invention claimed is:

1. A user control system for a multi-user internet program, comprising:
a sensor configured to capture data correlated to a geometry of an anatomical feature selected from a group consisting of a face, a head, a neck, and shoulders;
a conversion subroutine adapted to receive captured data from the sensor and output an anatomically-dependent symbolic instruction derived from said captured data; and
a symbolic-instruction-consuming subroutine adapted to receive the anatomically-dependent symbolic instruction and alter an operation of the multi-user internet program on the basis of said anatomically-dependent symbolic instruction.

2. The user control system for a multi-user internet program of claim 1, wherein the operation altered is one of: a facial configuration of a virtual player in the multi-user internet program; an initiation of an action of a virtual player in the multi-user internet program including one of eating food and gathering items; a termination of an action of a virtual player in the multi-user internet program including one of eating food and gathering items; and an initiation of a pattern of movement including one of walking, running, skipping, jumping, swimming, flying, crouching, punching, and waving.

3. A method for controlling a multi-user internet program using facial distortions, comprising:
defining a set of user commands;
defining a set of alterations in facial geometry corresponding to the set of user commands;
recording sensor data from a sensor encoding information of user facial features;
deriving information of alterations in user facial geometry from recorded sensor data encoding information of user facial features;
automatically selecting a user command from the set of user commands based on information of alterations in user facial geometry;
implementing the user command to alter a behavior of the multi-user internet program.

4. The method for controlling a multi-user internet program using facial distortions of claim 3, wherein the behavior altered is one of: a facial configuration of a virtual player in the multi-user internet program; an initiation of an action of a virtual player in the multi-user internet program including one of eating food and gathering items; a termination of an action of a virtual player in the multi-user internet program including one of eating food and gathering items; and an initiation of a pattern of movement including one of walking, running, skipping, jumping, swimming, flying, crouching, punching, and waving.

5. A system for converting facial distortions to computer control signals in a gaming environment, comprising:
a sensor configured to capture data related to a factor that changes contemporaneously with a change in a geometry of one of a user's face, head, neck, and shoulders,
the change in geometry manifested by an innervation of a nerve of the user,
the innervation of the nerve resulting in a contraction of a muscle of the user,
the contraction of the muscle contributing to a manifestation of the change in geometry;
a conversion processor receiving the captured data and generating in response thereto a user-selected symbolic value; and
an alteration processor receiving the user-selected symbolic value, wherein, based on the user-selected symbolic value, the system alters at least one component of at least one feature in the gaming environment.

6. The system for converting facial distortions to computer control signals of claim 5, wherein the conversion processor and the alteration processor are the same processor.

7. The system for converting facial distortions to computer control signals of claim 5, wherein the sensor is comprised, at least in part, of one of an accelerometer, a video camera, and a facial-recognition apparatus.

8. The system for converting facial distortions to computer control signals of claim 5, wherein the user-selected symbolic value specifies a facial configuration of virtual player in a multiplayer entertainment game.

9. The system for converting facial distortions to computer control signals of claim 5, wherein the user-selected symbolic value specifies an action to be executed by a virtual player in a multiplayer entertainment game.

10. A user control system of a virtual player within a multi-player entertainment program, comprising:
a sensor configured to capture data related to a factor that changes contemporaneously with a change in a geometry of one of a user's face, head, neck, and shoulders,
the change in geometry manifested by an innervation of a nerve of the user,
the innervation of the nerve resulting in a contraction of a muscle of the user,
the contraction of the muscle contributing to a manifestation of the change in geometry;
a conversion processor receiving the captured data and generating in response thereto a user-selected symbolic value;
and an alteration processor receiving the user-selected symbolic value, wherein, based on the user-selected symbolic value, the user control system alters at least one of an appearance, a behavior, an orientation, a pattern of movement, an operational state, and a characteristic of a virtual player within a multi-player entertainment program.

11. The user control system of a virtual player within a multi-player entertainment program of claim 10, wherein the conversion processor and the alteration processor are the same processor.

12. The user control system of a virtual player within a multi-player entertainment program of claim 10, wherein the sensor is comprised, at least in part, of one of an accelerometer, a video camera, and a facial-recognition apparatus.

13. The user control system of a virtual player within a multi-player entertainment program of claim 10, wherein the user-selected symbolic value specifies a facial configuration of the virtual player in a multiplayer entertainment game.

14. The user control system of a virtual player within a multi-player entertainment program of claim 10, wherein the user-selected symbolic value specifies an action to be executed by the virtual player in a multiplayer entertainment game.

15. A method of facilitating a user's control of a virtual player within a multiplayer entertainment program using facial distortions, comprising:
- defining a lexicon of symbolic virtual-player control signals which a user may specify in order to control a behavior of a virtual player within a multiplayer entertainment program;
- defining, for each symbolic virtual-player control signal in the lexicon, a user-manifested facial-distortion signal comprising, at least in part, one of a geometry of one of the user's face, head, neck, and shoulders, and an alteration of a geometry of one of the user's face, head, neck, and shoulders;
- obtaining a symbolic virtual-player control signal from a measurement provided by at least one sensor of a geometry of one of the user's face, head, neck, and shoulders;
- identifying within the lexicon a symbolic virtual-player control signal associated with the measurement;
- implementing the identified symbolic virtual-player control signal to alter a behavior of the virtual player within the multiplayer-entertainment-program.

16. The method of facilitating a user's control of a virtual player within a multiplayer entertainment program using facial distortions of claim 15, wherein the sensor is comprised, at least in part, of one of an accelerometer, a video camera, and a facial-recognition apparatus.

17. The method of facilitating a user's control of a virtual player within a multiplayer entertainment program using facial distortions of claim 15, wherein the user-selected symbolic virtual-player control signal specifies a facial configuration of a virtual player in the multiplayer entertainment program.

18. The method of facilitating a user's control of a virtual player within a multiplayer entertainment program using facial distortions of claim 15, wherein the user-selected symbolic virtual-player control signal specifies an action to be executed by a virtual player in the multiplayer entertainment program.

* * * * *